United States Patent
Lizarazo Patino

(10) Patent No.: US 11,086,582 B1
(45) Date of Patent: Aug. 10, 2021

(54) SYSTEM FOR DETERMINING POSITIONAL RELATIONSHIPS BETWEEN DISPLAY DEVICES

(71) Applicant: AMAZON TECHNOLOGIES, INC., Seattle, WA (US)

(72) Inventor: Steven Arturo Lizarazo Patino, Strassen (LU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/399,707

(22) Filed: Apr. 30, 2019

(51) Int. Cl.
*G06F 3/14* (2006.01)
*G06F 3/041* (2006.01)

(52) U.S. Cl.
CPC .......... *G06F 3/1446* (2013.01); *G06F 3/0416* (2013.01)

(58) Field of Classification Search
CPC .................................................. G06F 3/1446
USPC .......................................................... 345/173
See application file for complete search history.

(56) References Cited

U.S. PATENT DOCUMENTS

| | | | | |
|---|---|---|---|---|
| 2007/0124503 A1* | 5/2007 | Ramos | ..................... | G06F 3/017 709/248 |
| 2015/0334519 A1* | 11/2015 | Gai | ......................... | G06F 3/041 455/41.2 |
| 2017/0024072 A1* | 1/2017 | Kuge | ..................... | G06F 3/0412 |
| 2017/0102909 A1* | 4/2017 | Choi | ................... | G06F 3/04883 |

* cited by examiner

*Primary Examiner* — Long D Pham
(74) *Attorney, Agent, or Firm* — Lindauer Law, PLLC

(57) ABSTRACT

Devices having touchscreen displays or other types of sensors may be placed adjacent to one another to form a larger display area for content. A relative position and alignment between these adjacent devices are determined using a touch gesture by a user. For example, a user may draw a line, circle, or other shape that provides input to the touch sensors of the devices. Touch data received from each device indicates the coordinates where contact was provided to the touch sensor. By matching the coordinates positioned near the borders of adjacent devices based on the time of their input, the relative position and alignment between the devices is determined. A corresponding portion of the content is provided to each device based on its relative position and alignment to form a consistent display area.

20 Claims, 10 Drawing Sheets

SYSTEM FOR DETERMINING POSITIONAL RELATIONSHIPS BETWEEN DISPLAY DEVICES

BACKGROUND

In some cases, multiple display devices may each be used to present respective portions of content. For example, multiple users playing a game using respective computing devices may each receive different portions of content associated with the game. As another example, multiple display devices may be arranged adjacent to one another to form a larger display area, and respective portions of image or video content may be presented by each device based on the arrangement of the devices, such that the larger display area is used to present the entirety of the content. However, determining the manner in which multiple devices are arranged may require time-consuming and tedious manual configuration of device settings, and accurately representing the alignment and arrangement of devices in this manner may be difficult, resulting in the presentation of portions of content that are misaligned.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
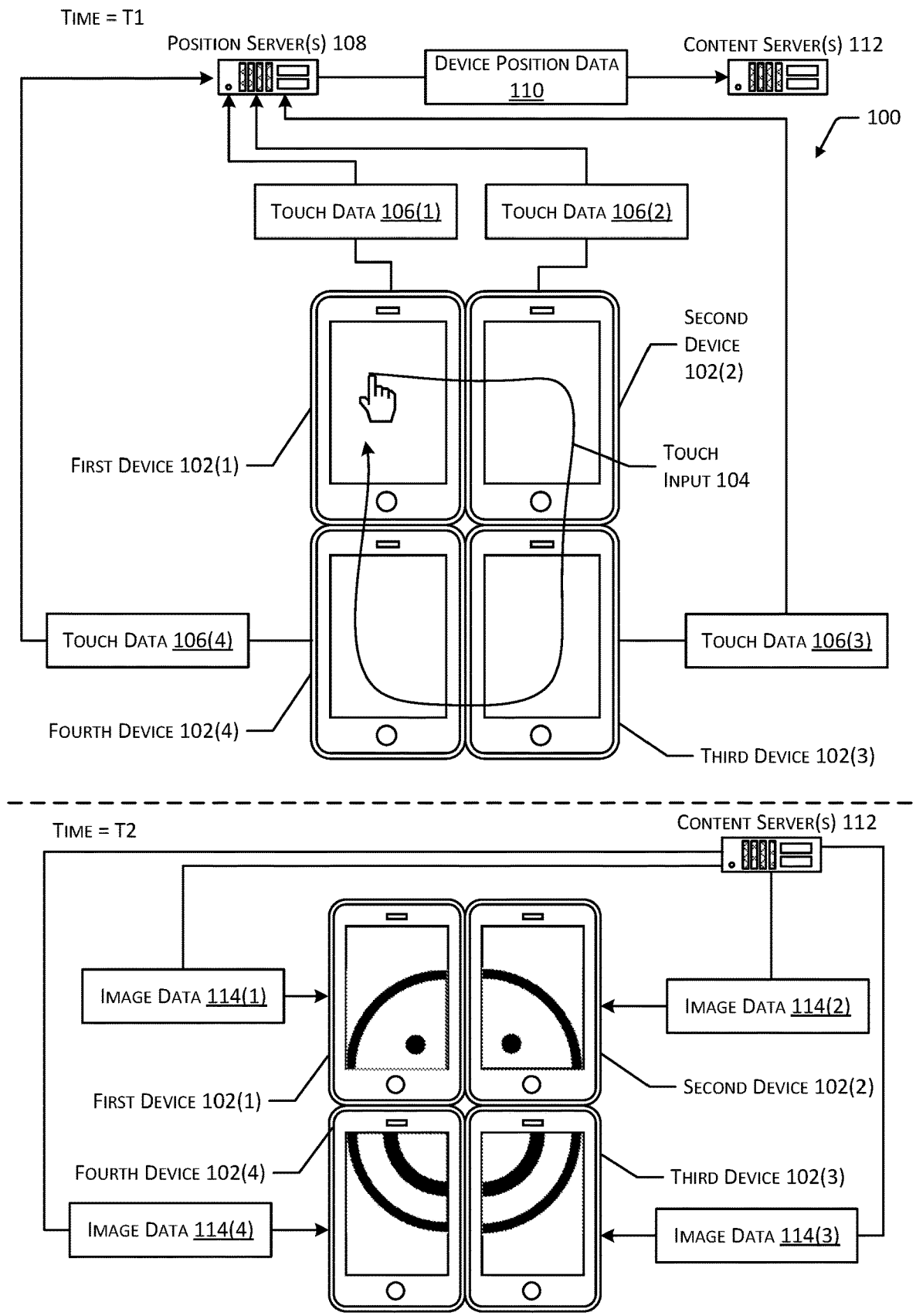
FIG. 1 depicts an implementation of a system for determining the positional relationships between computing devices at a first time, then providing content to the computing devices based on the determined positional relationship at a second time.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many user devices include an associated display that may be used to present visible content, such as images and videos. However, consumption of the content that is presented may be limited by the dimensions, shape, or resolution of the associated display. For example, a smartphone or tablet computer typically includes a relatively small, rectangular touchscreen display. In some cases, the size, shape, or other characteristics of a single display device may be non-ideal for the presentation of particular types of content. For example, a group of users playing a multiplayer game may each wish to receive a portion of the content associated with the game using a respective smartphone or other type of computing device. The particular portion of the content that is appropriate to be provided to each computing device may depend on the position of that computing device relative to other computing devices. As another example, a user may arrange multiple smartphones or tablet computers adjacent to one another to form a larger display area, such that portions of content may be presented using each screen in a manner that causes the entire image to be presented using the larger display area. However, the particular portion of the content that is presented using each display may depend on the position of each display relative to each adjacent display. For example, the specific position of each display relative to each adjacent display may affect the manner in which the respective portions of content presented on each display are arranged and aligned. Many devices lack hardware or software components that enable determination of the arrangement and alignment of an associated display relative to adjacent displays. In other cases, the arrangement and alignment of devices may be manually input by manipulating device configurations and settings, which may be a tedious, time-consuming, or inaccurate process.

Described in this disclosure are techniques for determining the position of display devices relative to other display devices using efficient, simple, and intuitive methods of user input, such as a touch or near-touch gesture that provides input to touch sensors that are associated with multiple display devices. For example, multiple computing devices having touchscreen displays, such as smartphones or tablet computers, may be placed adjacent to one another to form a larger display area. An application or other type of software component may be executed on each device, and the physical proximity of each device relative to the adjacent device may be determined, such as through use of geolocation systems, network addresses, timestamps associated with input received by the devices, or signals detected by the devices, such as service set identifiers (SSIDs) indicative of networks, Bluetooth beacons, radio frequency identification (RFID) signals, acoustic signals, light signals, and so forth. For example, two devices that detect the same or a similar set of SSIDs from networks may be physically proximate to one another. A user may provide input to the touch sensors of each device, such as by providing a continuous touch gesture that contacts and passes across each touchscreen display. In other cases, a user may provide other types of input that indicate a portion of the touch screen displays, independent of whether a physical touch is used. For example, other types of input may include contacting a touchscreen display with a device, such as a stylus or pointer, or a near-touch provided to a touch sensor using the user's body or a device. In other cases, the input may include other methods for indicating particular coordinates, such as use of a device that emits a detectable signal indicative of a portion of a display, use of cameras or image sensors to determine portions of a display indicated by a user, and so forth. Touch data from each device, regardless of the type of input from which the touch data is determined, may be determined based on the touch input or other type of input that was received. The touch data may indicate a location within a display area that is indicated by the input. For example, touch data may include one or more coordinates of a touchscreen display that received a touch input from a user. As another example, touch data may include coordinates of a display that were determined based on image data from one or more cameras or internal sensors of one or more devices used to point toward or otherwise indicate a region of a display. Continuing the example, touch data may be generated that indicates where a user is pointing at on a display. The touch data may be used to determine a first coordinate at or proximate to a border of the display area where the touch input initially entered the display area, and a second coordinate at or proximate to a border of the display area where the touch input or other type of user input exited the display area to enter the display area of an adjacent device. In some cases, the border of a display area may include the edge of the display area. In other cases, the border may include a boundary within a display area other than the edge of the display area. Based on the order in which the touch sensors of each device received input, the position of each device relative to the other devices may be determined. Additionally, based on the particular coordinates determined at the borders of two adjacent display areas based on the touch data, the alignment of each display area relative to each adjacent display area may be determined. For example, a first coordinate at which a touch gesture exits a first display area and a second coordinate at which the touch gesture enters a second display area may indicate that the two coordinates are adjacent to or aligned with one another. In some implementations, a touch gesture may continue to span the touch sensors of the computing devices multiple times, and additional coordinates at or proximate to the borders of adjacent devices may be determined and used to verify or improve the precision of the determined alignment between adjacent devices. For example, during the alignment process, a portion of a visible pattern may be presented on each of the displays, and a user may continue to provide input to the devices until the visible pattern is properly aligned across the larger display area formed by the adjacent devices. When no touch input or other type of input is received by any of the devices for a threshold length of time, the process for determining the position or alignment of the devices may be concluded and respective portions of content may be provided to each of the devices. In other implementations, the process for determining the position or alignment may be concluded when a touch input or other type of input reaches the first device where the input began. The particular portions of content provided to each device and the arrangement of the portions may be determined based on the relative position of each device, the alignment of each device, or both the relative position and the alignment. In some implementations, after determining the position and alignment of devices, content may be shared between devices. For example, it may be determined that two devices have been placed adjacent to one another, such that the border of a touchscreen display of a first device is adjacent to a border of a touchscreen display of a second device. A user may initiate transfer of data such as an image, an electronic list of items to be purchased, data regarding an individual item, or other type of data by using a touch gesture that selects data and passes from the touchscreen display of a first device to the touchscreen display of a second device. To prevent inadvertent sharing of content, the transfer of data in this manner may be limited to touch gestures that cross a particular border of a touchscreen display. For example, two devices may be placed such that the top borders of the devices are adjacent to one another, and content may be shared using touch gestures that cross the top borders of each device.

As one skilled in the art will appreciate in light of this disclosure, certain embodiments may be capable of achieving certain advantages. For example, use of the techniques described herein to determine the arrangement and alignment of different display devices may improve the user experience for content consumption by enabling content to be presented using multiple devices, such as a larger display area formed by multiple adjacent displays. By enabling the relative position and alignment of devices to be determined using touch inputs to the touch sensors of each device, or other types of input that indicate portions of a display area, content may be presented using multiple devices without requiring specialized hardware or software for determining the position and alignment of the devices. Additionally, use of touch inputs to the touch sensors of each device, or other types of intuitive input that indicate portions of a display area, may enable the devices to be configured to present content without requiring manual manipulation of settings or configurations, resulting in a faster and easier process. In some cases, the devices may be used to provide immediate feedback to a user regarding the determined position and alignment, such as by presenting a visual pattern, which may enable a user to continue providing input to the devices until the pattern appears correctly, resulting in an intuitive and efficient system for soliciting additional input from a user while also enabling the user to determine a time when no additional input is necessary and the process may be concluded.

FIG. 1 depicts an implementation of a system 100 for determining the positional relationships between computing devices at a first time T1, then providing content to the computing devices based on the determined positional relationship at a second time T2. Four example computing devices, each having a touchscreen display (e.g., a display area with an integrated touch sensor), are shown placed adjacent to and abutting one another to form a larger display area, defined by the individual display areas of each computing device. Specifically, FIG. 1 depicts the four computing devices positioned in a rectangular arrangement with a first device 102(1) positioned to the left of a second device 102(2). The second device 102(2) is positioned above a third device 102(3), which is positioned to the right of a fourth device 102(4). The fourth device 102(4) is positioned below the first device 102(1). Each of the computing devices is shown as a smartphone having a rectangular touchscreen display surrounded by a bezel that may include various other components, such as microphones, speakers, buttons or other controls, and so forth. However, the techniques described herein may be used with any type of computing device having an associated display including, without limitation, smartphones, tablet computers, laptop computers, other types of portable computing devices, wearable computing devices, automotive computing devices, smart televisions or other media devices, and so forth.

The touch sensors associated with each of the devices 102 may receive a touch input 104 to one or more coordinates associated with the touch sensors and may generate touch data 106 indicative of the particular coordinates to which input was received. For example, a touch input 104 may include contact between a finger or other portion of a user's body and a touchscreen display. As another example, a touch input 104 may include a near-touch, such as a finger or other portion of a user positioned proximate to a touch sensor, without necessarily contacting the touch sensor, within a distance that enables the presence of the user to be detected. As yet another example, a touch input 104 may include contact or a near-touch between a touch sensor and an implement, such as a stylus, pen, pointer, or other type of tool or device configured to provide input to the touch sensor. In other implementations, in place of or addition to a touch input 104, devices 102 may receive other types of input that may be used to indicate particular coordinates or locations within a display area. For example, a game controller, light gun, laser, or other type of device may be used to point toward, select, or otherwise indicate a particular location within a screen, such as by emitting a detectable signal. In some cases, a device may include internal sensors, such as motion sensors, accelerometers, gyroscopes, position sensors, and so forth, that may be used to determine the particular location within a screen that is indicated based on the position, orientation, or motion of the device. As another example, a camera or other type of image sensor capable of gesture recognition may determine an indication of a particular location within a screen that is being indicated by a user or an implement. As such, while FIG. 1 depicts the devices 102 as smartphones having touch sensors integrated with displays for receiving touch input 104, the devices 102 may receive any manner of input that indicates a particular coordinate or other location of a display area, independent of the manner in which the location is indicated.

In some implementations, the touch input 104 may include a generally continuous touch gesture that provides input to the touch sensors of each of the devices 102. For example, FIG. 1 depicts the touch input 104 including a generally elliptical or rectangular gesture that provides input to the touchscreen display of the first device 102(1), proceeds in a lateral direction to provide input to the touchscreen display of the second device 102(2), proceeds in a vertical direction to provide input to the touchscreen display of the third device 102(3), proceeds in a lateral direction to provide input to the touchscreen display of the fourth device 102(4), then proceeds in a vertical direction to provide input to the touchscreen display of the first device 102(1). While FIG. 1 shows the touch input 104 as a generally continuous touch gesture having an elliptical or rectangular shape, the touch input 104 may include any type of continuous or non-continuous input to the touch sensors of each of the devices 102. For example, the touch input 104 may include a gesture having any shape and may provide input to the touch sensors of one or more of the devices 102 multiple times. Continuing the example, the touch input 104 may include a spiral shape that provides input to each of the touch sensors multiple times, a gesture that reverses direction to provide input to a portion of the touch sensors multiple times, multiple linear gestures that cross the borders between adjacent devices 102, tap gestures that indicate each of the devices 102 in sequence, and so forth.

Each device 102 may generate touch data 106 indicative of the coordinates associated with the touch input 104. As described previously, in some cases, the coordinates of a display area may be indicated using other types of input, and input data indicative of the indicated coordinates may be generated and used in place of or in addition to touch data 106. In some implementations, one or more position servers 108 may receive the touch data 106 or other input data from each of the devices 102 and determine the relative position of each device 102 to one or more other devices 102 and the alignment between each device 102 and the adjacent devices 102 based on the touch data 106 or other input data. For example, FIG. 1 depicts a position server 108 generating device position data 110 based on the touch data 106 received from each of the devices 102. The device position data 110 may indicate the relative positions and alignments of each device 102. While FIG. 1 depicts a single position server 108, any number and any type of computing devices may be used to determine device position data 110 based on the touch data 106 or other input data including, without limitation, one or more personal computing devices, portable computing devices, wearable computing devices, automotive computing devices, media devices, servers, and so forth. Additionally, in other implementations, one or more of the devices 102 receiving the touch input 104 or another type of input may be used to perform the functions described with regard to the position server(s) 108 and use of a separate position server 108 may be omitted. In still other implementations, any combination of the devices 102 or position server(s) 108 may be used to perform the functions described herein. In some implementations, touch data 106 or device input data may be communicated between the devices 102 or other computing devices in an environment with the devices 102 using peer-to-peer communication, such as gossip or epidemic protocol.

FIG. 1 depicts the first device 102(1) providing first touch data 106(1) to the position server(s) 108, the second device 102(2) providing second touch data 106(2), the third device 102(3) providing third touch data 106(3), and the fourth device 102(4) providing fourth touch data 106(4). In addition to the coordinates of a touch sensor that receive input, in some implementations, the touch data 106 provided by each device 102 may include other information such as a device identifier associated with the respective device 102, other characteristics of the device 102 such as dimensions, a resolution or other characteristics of the display area, a timestamp or another type of time data indicating a time when the input was received, or other characteristics of the touch input 104 such as a force, speed, direction, or length of time that input was received by a touch sensor. Additionally, in some implementations, touch data 106 may be provided from a device 102 to the position server(s) 108 periodically or continuously rather than as a discrete transmission. For example, touch data 106 received periodically or continuously from a device 102 may indicate whether the touch sensor of the device 102 is currently receiving input. Continuing the example, if the touch data 106 received from any of the devices 102 indicates that a touch sensor is currently receiving input, a process for determining the position and alignment of the devices may continue as additional touch input 104 is received. However, if no touch input 104 or other type of input indicating a portion of a display area is received by any of the devices 102 for at least a threshold length of time, the process may be concluded and content may be provided to the devices 102 for presentation based on the determined position and alignment of each device 102. In some implementations, touch data 106 or other types of input data may be received from a device 102 in response to a request or a heartbeat signal from the position server(s) 108.

One or more content servers 112 may receive the device position data 110 and provide different content to each of the devices 102 based on the device position data 110. For example, at the second time T2, FIG. 1 depicts the content server(s) 112 providing image data 114 to each of the devices 102. While FIG. 1 depicts the content server(s) 112 providing image data 114, in other implementations, other types of content may be provided to the devices 102, such as video data, alphanumeric data, audio data, haptic data, and so forth. Additionally, while FIG. 1 depicts a content server 112 providing content to the devices 102, in other implementations, content that is locally stored on a device 102 or stored in data storage or another computing device accessible to one or more of the devices 102 may be used. Continuing the example, FIG. 1 depicts the content server(s) 112 providing first image data 114(1) to the first device 102(1), second image data 114(2) to the second device 102(2), third image data 114(3) to the third device 102(3), and fourth image data 114(4) to the fourth device 102(4). In some implementations, each portion of the image data 114 provided to a device 102 may represent a portion of an image to be presented by the receiving device 102. The content server 112 may determine a particular portion of the image data 114 to be provided to a particular device 102 based on the position and alignment of the device 102 indicated in the device position data 110. For example, when four devices 102 are positioned in a rectangular arrangement, as shown in FIG. 1, a first device 102(1) positioned in the upper-left corner of the rectangular arrangement may receive image data 114(1) corresponding to the upper-left portion of an image, which may be presented by the first device 102(1). The specific position of the presented image within the display area of the first device 102(1) may be determined based on the alignment of the first device 102(1) relative to the adjacent second device 102(2) and fourth device 102(4). For example, the portions of the images presented by each device may be positioned such that the image portions appear to align to form a complete image that occupies the larger display area defined by the four smaller displays of the adjacent devices 102. In other implementations, content may include data shared between one or more devices 102. For example, a user may select data on a particular device 102 and initiate transfer of the selected data to another device 102 by providing a touch gesture that passes from the touchscreen display of a first device 102 to the touchscreen display of a second device 102. Continuing the example, sharing of content may be used for community shopping applications, like transferring information regarding an item available for purchase from a first device 102 to another device 102, transferring all or a portion of an electronic list of items, such as a wish list or registry for an event, and so forth.

Figure 2:
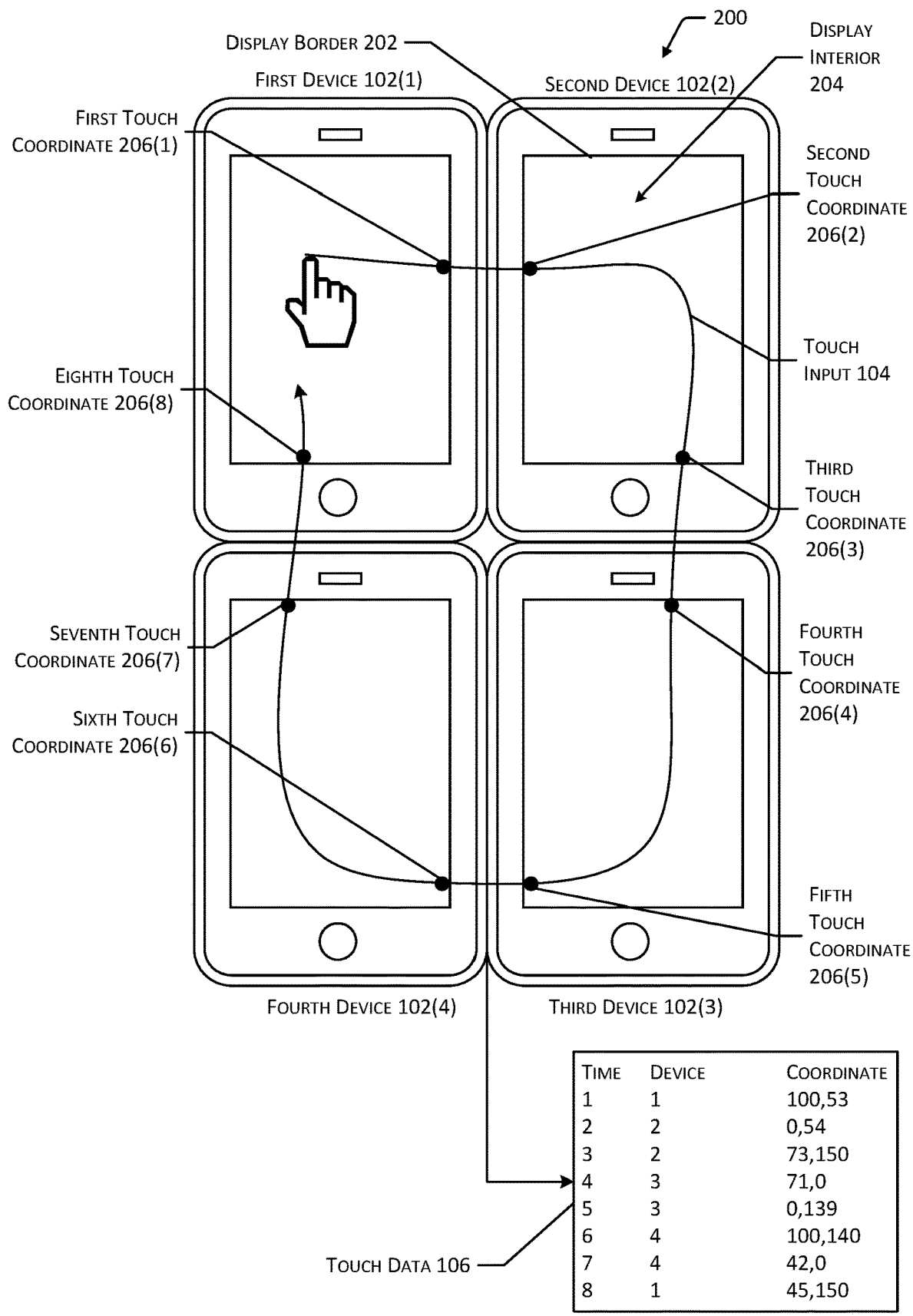
FIG. 2 depicts an example arrangement of computing devices and the determination of touch data that may be used to determine the positional relationships between the computing devices.

FIG. 2 depicts an example arrangement 200 of computing devices and the determination of touch data 106 that may be used to determine the positional relationships between the computing devices. As described with regard to FIG. 1, any type of computing device having a display may be positioned in association with at least one other computing device having a display to define a larger display area. For example, FIG. 2 depicts four example devices 102, each shown as smartphones having a touchscreen display (e.g., a display integrated with a touch sensor). A first device 102(1) is shown positioned to the left of a second device 102(2), which is positioned above a third device 102(3), which is positioned to the right of a fourth device 102(4), which is positioned below the first device 102(1). As such, the four devices 102 are shown positioned in a generally rectangular arrangement, with each device 102 adjacent to and abutting two adjacent devices 102.

The touchscreen displays for the devices 102 include a display border 202 that surrounds a display interior 204, such that the display border 202 separates the display area and touch sensor from other portions of the device 102 that do not include the display or touch sensor, such as a bezel, housing, or other components of the device 102. The touch sensor may be conceptually divided into touch coordinates 206 indicative of the particular location of the touch sensor to which a touch input 104 is received. For example, a touch input 104 to a first portion of a touch sensor may be associated with a first touch coordinate 206, while input to a different portion of the touch sensor may be associated with a second touch coordinate 206. As described with regard to FIG. 1, a touch input 104, such as a touch gesture that provides input to the touch sensors of each of the devices 102, may be used to determine touch data 106 indicative of the input to each device 102. The touch data 106 may in turn be used to generate device position data 110 indicative of the relative position and the alignment of each of the devices 102. Additionally, as described with regard to FIG. 1, in some cases, other types of input that indicate coordinates or other regions within a display area may be received, in addition to or in place of touch input 104, and other types of input data in addition to or in place of touch data 106 may be generated based on the other types of input and used to determine device position data 110.

FIG. 2 depicts touch input 104 that provides input to various portions of the touch sensor of the first device 102(1), including a first touch coordinate 206(1) proximate to (e.g., within a threshold distance of) a display border 202 of the first device 102(1) that is adjacent to the second device 102(2). The touch input 104 may then provide input to a second touch coordinate 206(2) of the second device 102(2) proximate to a display border 202 of the second device 102(2) that is adjacent to the first device 102(1). The touch input 104 may also provide input to various other portions of the touch sensor of the second device 102(2) including a third touch coordinate 206(3) proximate to a display border 202 of the second device 102(2) that is adjacent to the third device 102(3). The touch input 104 may additionally provide input to a fourth touch coordinate 206(4) of the third device 102(3) proximate to a display border 202 of the third device 102(3) that is adjacent to the second device 102(2), and other portions of the touch sensor of the third device 102(3), including a fifth touch coordinate 206(5) of the third device 102(3) proximate to a display border 202 of the third device 102(3) that is adjacent to the fourth device 102(4). The touch input 104 may also provide input to a sixth touch coordinate 206(6) of the fourth device 102(4) proximate to a display border 202 of the fourth device 102(4) that is adjacent to the third device 102(3), and other portions of the touch sensor of the fourth device 102(4), including a seventh touch coordinate 206(7) proximate to a display border 202 of the fourth device 102(4) that is adjacent to the first device 102(1). The touch input 104 may provide input to an eighth touch coordinate 206(8) proximate to a display border 202 of the first device 102(1) that is adjacent to the fourth device 102(4).

Each device 102 may generate touch data 106 indicative of a device identifier associated with the device 102, a particular touch coordinate 206 to which input was received, and a timestamp or other indication of a time at which the input was received. The time at which input to each touch coordinate 206 is received may indicate the position of a device 102 relative to other devices 102. For example, FIG. 2 depicts example touch data 106 indicating that input to the first touch coordinate 206(1) is received prior to input to the second touch coordinate 206(2) and third touch coordinate 206(3), which is received prior to input to the fourth touch coordinate 206(4) and fifth touch coordinate 206(5), which is received prior to input to the sixth touch coordinate 206(6) and seventh touch coordinate 206(7), which is received prior to input to the eighth touch coordinate 206(8). Receipt of input to the first touch coordinate 206(1) prior to the second touch coordinate 206(2), but within a threshold length of time of receipt of input to the first touch coordinate 206(1), may indicate that the touch input 104 was received by the first device 102(1) prior to the second device 102(2) and that the first device 102(1) is adjacent to the second device 102(2). Similarly, receipt of input to the third touch coordinate 206(3) prior to and within a threshold length of time of receipt of input to the fourth touch coordinate 206(4) may indicate that the touch input 104 reached the third device 102(3) subsequent to the second device 102(2), and the third device 102(3) is adjacent to the second device 102(2). Receipt of input to the fifth touch coordinate 206(5) prior to and close in time to receipt of input to the sixth touch coordinate 206(6) may indicate that the fourth device 102(4) received input subsequent to the third device 102(3) and is adjacent to the third device 102(3). Receipt of input to the eighth touch coordinate 206(8) subsequent to and close in time to receipt of input to the seventh touch coordinate 206(7) may indicate that the first device 102(1) received additional input subsequent to receipt of input by the fourth device 102(4), and that the first device 102(1) is adjacent to the fourth device 102(4).

Additionally, the specific location of each touch coordinate 206 proximate to a display border 202 of a device 102, relative to a touch coordinate 206 proximate to an adjacent display border 202 of another device 102 may be used to determine the alignment between adjacent devices 102. For example, when input to the second touch coordinate 206(2) is received subsequent to and close in time to input to the first touch coordinate 206(1), this may indicate that the first touch coordinate 206(1) and second touch coordinate 206(2) are in approximate alignment. FIG. 2 depicts an example touch input 104 that provides input to the touch sensors of each device 102 at two touch coordinates 206 proximate to the display borders 202 of the device 102. In other implementations, the touch input 104, or additional touch inputs 104, may provide input to additional sets of adjacent touch coordinates 206 that may increase the precision of the alignment determined between adjacent devices 102. For example, if three sets of adjacent touch coordinates 206 along adjacent display borders 202 of devices 102 are determined, the average lateral offset between coordinates may be used to increase the precision of the determined alignment between the devices 102.

Figure 3:
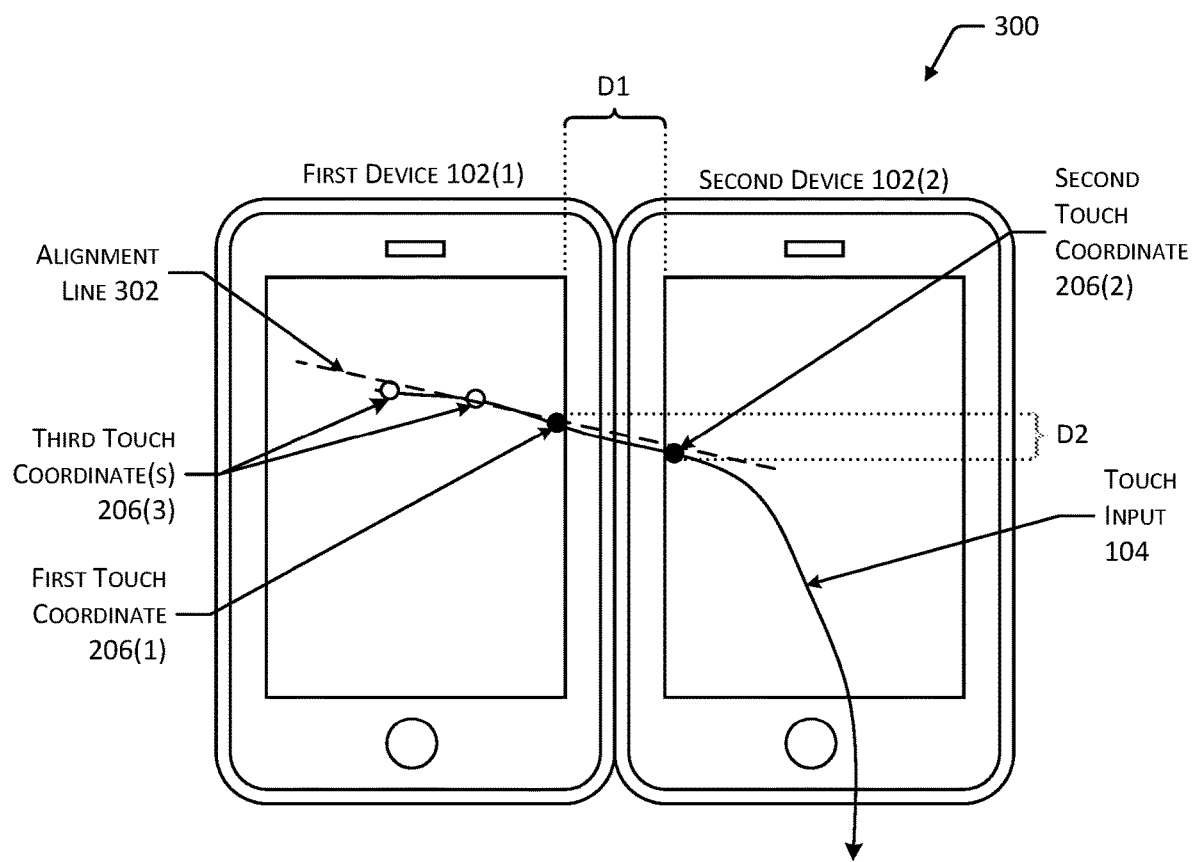
FIG. 3 illustrates one implementation of a method for determining relative alignment between computing devices.

FIG. 3 illustrates one implementation of a method 300 for determining relative alignment between computing devices. In some cases, a computing device may have a display or touch sensor that does not extend to the border of the computing device. For example, a bezel, a housing, or other components of a device 102 may be positioned adjacent to or surrounding a display. Continuing the example, FIG. 3 depicts a first device 102(1) and a second device 102(2) as smartphones having a rectangular display surrounded on each side by a portion of a rectangular bezel. As a result, the border of the display area and touch sensor of the first device 102(1) is spaced from the adjacent border of the display area of the second device 102(2) by a first distance D1. As such, a touch input 104 or other type of input provided to the first device 102(1) that crosses the first distance D1 to also provide input to the second device 102(2) would not provide input when crossing the first distance D1.

In some cases, a touch input 104 or other type of input that provides input to both the first device 102(1) and the second device 102(2) while crossing the distance D1 may not include a gesture or path that is perpendicular to the borders of the display area and touch sensors of the devices 102. For example, if a touch input 104 includes a gesture having a curved, slanted, or irregular shape, the touch input 104 may provide input to a first touch coordinate 206(1) of the first device 102(1) and a second touch coordinate 206(2) of the second device 102 that are laterally offset from one another by a second distance D2. In such a case, if the first touch coordinate 206(1) and second touch coordinate 206(2) were assumed to be aligned with one another (e.g., by assuming that the second distance D2 is approximately zero), content provided to the devices 102 for presentation may appear misaligned. In some implementations, to account for the path or shape of the gesture indicated by the touch input 104 or other types of input, input indicating other regions of the first device 102(1), such as regions within the display interior 204, may be received and used to determine an alignment line 302 indicative of the direction in which the touch input 104 or other type of input was provided. For example, FIG. 3 depicts the touch input 104 including input to one or more third touch coordinates 206(3) within the display interior 204 of the first device 102(1). Based on the third touch coordinate(s) 206(3) and the first touch coordinate 206(1), an alignment line 302 may be determined, such as by using one or more best fit algorithms that includes the third touch coordinate(s) 206(3) and first touch coordinate 206(1) as data points. Based on the slope of the alignment line 302 and the size of the first distance D1 between the devices 102, a size of the second distance D2 and thus, a position of the second touch coordinate 206(2) relative to the first touch coordinate 206(1) may be determined.

In other implementations, other methods for determining the alignment between devices 102 may be used. For example, a single touch input 104 or multiple touch inputs 104 may be received from which multiple sets of adjacent touch coordinates 206 between adjacent devices 102 may be determined. Use of a larger number of adjacent touch coordinates 206 may be used to improve the precision of a determined alignment between adjacent devices 102. In some implementations, respective portions of a pattern or another type of visible output may be provided to each device 102 while the touch input 104 is provided to the devices 102, and a user may continue to provide additional touch input 104 until the alignment of the pattern appears correct.

Figure 4:
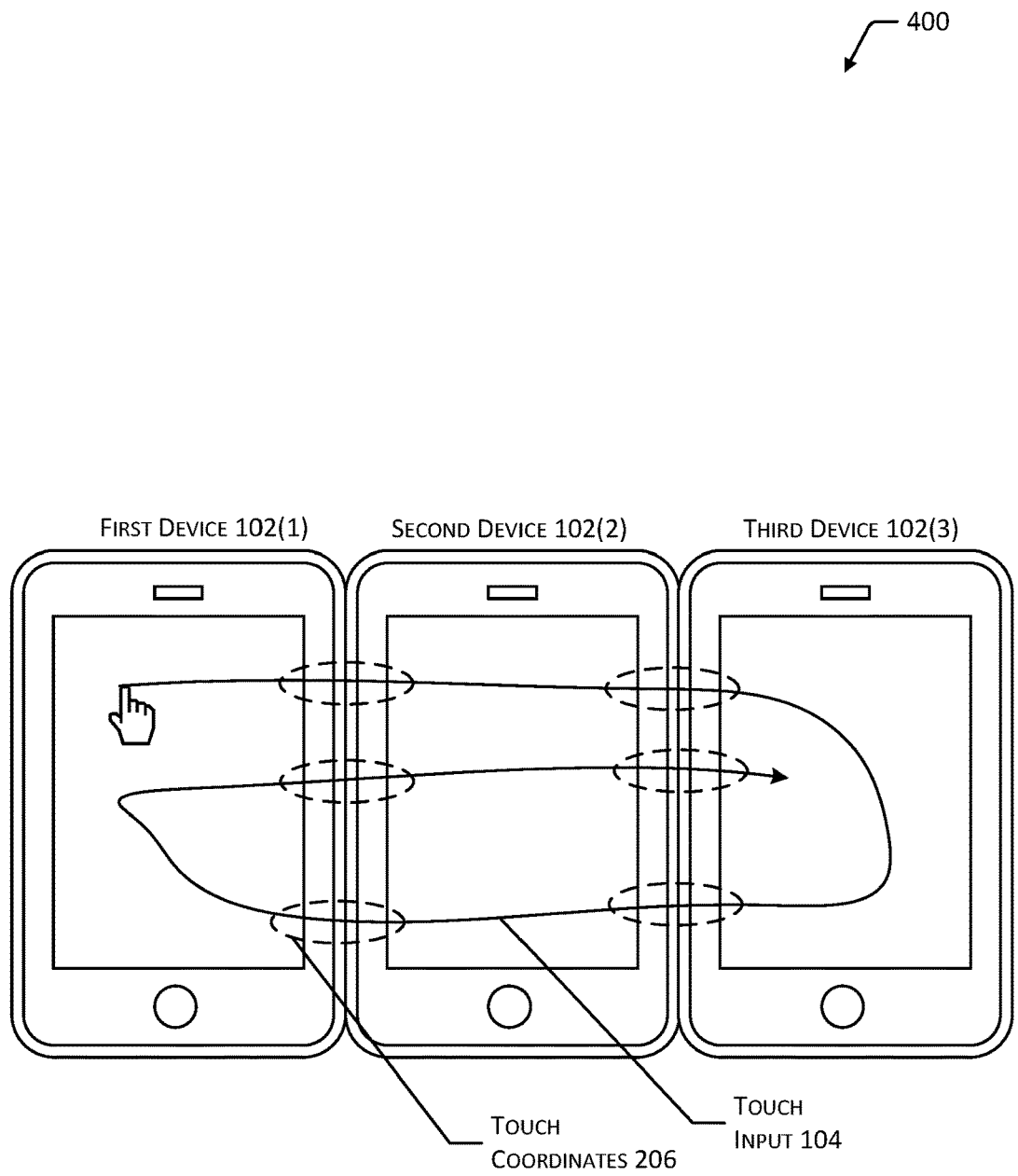
FIG. 4 illustrates an example arrangement of computing devices receiving touch input.

FIG. 4 illustrates an example arrangement 400 of computing devices receiving touch input 104. While FIGS. 1-3 illustrate an example arrangement of four generally identical devices 102 positioned in a rectangular configuration, any arrangement of devices 102, including multiple types of devices 102, may be used. For example, FIG. 4 illustrates an arrangement 400 in which a first device 102(1) is positioned to the left of a second device 102(2), which is positioned to the left of a third device 102(3). As such, the devices 102 form a generally horizontal line that defines a display area having an elongated rectangular shape. A touch input 104 that provides input to the touch sensors of each device 102 may be used to determine the position of each device 102 relative to other devices 102 based on the order in which the touch input 104 provides input to each device 102. Additionally, the touch input 104 may be used to determine sets of adjacent touch coordinates 206, as described with regard to FIGS. 2 and 3, which may be used to determine the alignment of a device 102 relative to an adjacent device 102. In other cases, as described with regard to FIGS. 1-3, other types of input that indicate portions of the display areas of the devices 102 may be used in addition to or in place of touch input 104. The depicted touch input 104 includes a touch gesture that crosses a border between the first device 102(1) and the second device 102(2) three times, resulting in input to six touch coordinates 206 proximate to the display borders 202 of the first device 102(1) and the second device 102(2). Similarly, the touch input 104 also crosses a border between the second device 102(2) and the third device 102(3) three times, resulting in input to six touch coordinates 206 proximate to the display borders 202 of the second device 102(2) and the third device 102(3). As described with regard to FIGS. 1-3, sets of adjacent touch coordinates 206 may be used to determine an alignment between adjacent devices 102. Determining larger numbers of touch coordinates 206 from the touch input 104 may improve the precision of the determined alignment.

Figure 5:
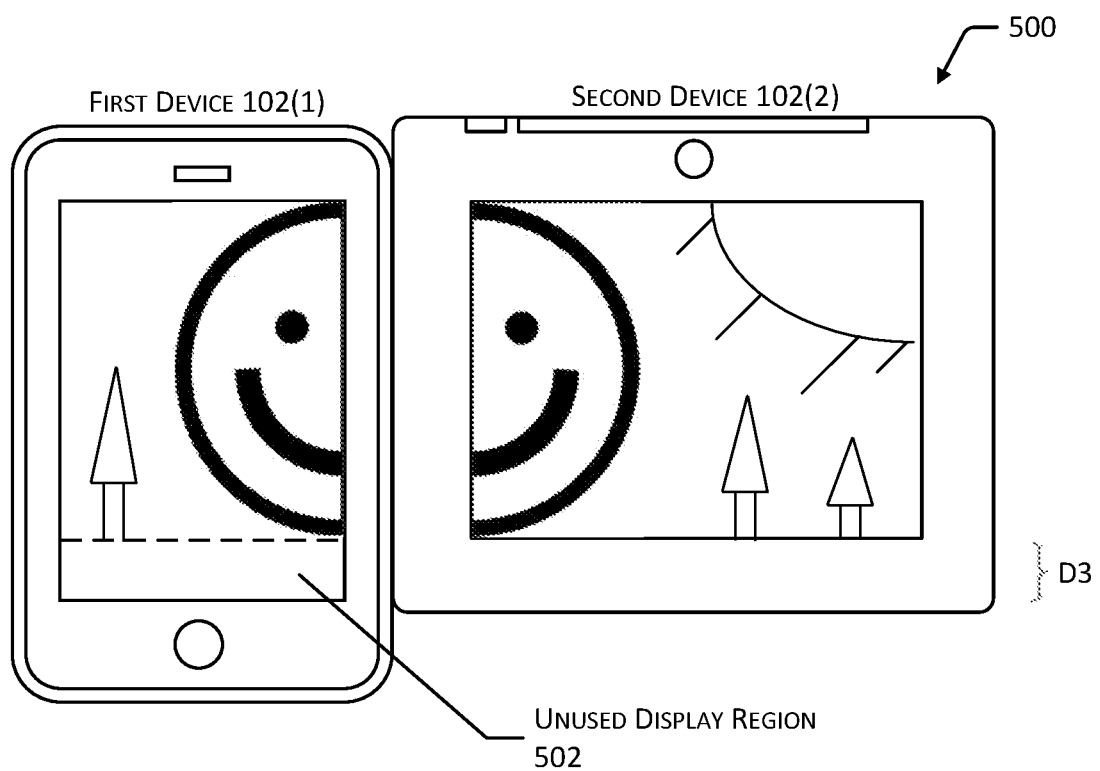
FIG. 5 illustrates an example arrangement of different types of computing devices presenting content.

FIG. 5 illustrates an example arrangement of different types of computing devices. For example, FIG. 5 depicts a first device 102(1) and a second device 102(2) having different dimensions. Continuing the example, the first device 102(1) is shown as a smartphone having a display area with the shape of a vertically elongated rectangle. The second device 102(2) is shown as a tablet computer having a display area with the shape of a horizontally elongated rectangle. Due to a difference in the dimensions of the display areas, the bottom edge of the display area of the first device 102(1) is offset by a distance D3 from the bottom edge of the display area of the second device 102(2). In such a case, the resulting larger display area defined by the displays of the devices 102 may have an irregular shape, while the content presented using the larger display area may have a regular rectangular shape. In some implementations, portions of a display area that extend beyond the borders of a rectangle or other regular shape that shares an edge with at least one edge of a display area of a computing device may constitute an unused display region 502 in which content is not presented. In other implementations, content may be presented in the unused display region 502 of a first device 102(1), while content presented in the display areas of other devices 102(2) may be scaled or may include a portion of the content that is not visible due to the boundary of the display area of the device 102(2).

Figure 6:
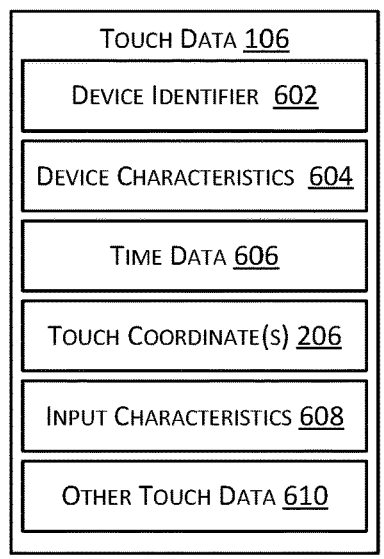
FIG. 6 is a series of block diagrams illustrating example implementations of touch data and device position data.
Figure 6:
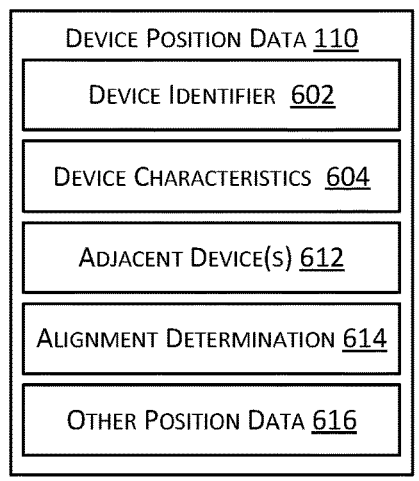

FIG. 6 is a series of block diagrams 600 illustrating example implementations of touch data 106 and device position data 110. As described previously, touch data 106 may be determined based on touch input 104, or other types of input, indicating coordinates, or other types of locations, within a display area or touch sensor. For example, a touch input 104 may include a touch gesture that contacts or provides a near-touch to a touchscreen display or other type of touch sensor. As another example, a touch input 104 may include use of a stylus or other type of implement to provide contact or a near-touch to a touch sensor. As yet another example, other types of input in addition to or in place of a touch input 104 may be received, such as use of a game controller, light gun, laser, camera, or other implement to indicate a coordinate or other location within a display area or to determine a coordinate or other location indicated by a user or device. Touch data 106 or other types of input data may be determined based on the touch input 104 or other types of input that are received. As such, while FIG. 6 depicts a block diagram 600 illustrating an example implementation of touch data 106 that may be generated based on touch input 104, other types of input data may be generated based on other types of input in addition to or in place of touch input 104.

The touch data 106 or other type of input data may include a device identifier 602 indicative of the device 102 receiving the touch input 104 or other type of input. The device identifier 602 may include any manner of data that may be used to differentiate a particular device 102 from other devices 102, such as a device name, serial number, or other alphanumeric string, a network address, and so forth. For example, touch data 106 received from the first device 102(1) would be associated with a device identifier 602 indicative of the first device 102(1), while touch data 106 received from the second device 102(2) would be associated with a device identifier 602 indicative of the second device 102(2).

The touch data 106 or other type of input data may also indicate one or more device characteristics 604. Device characteristics 604 may include hardware or software components of a device 102, such as a device type, a size, resolution, or other characteristics of a device display, a size or other characteristics of a device touch sensor, an indication of one or more applications, services, or other software components executing on or stored on the device 102, and so forth. For example, a device characteristic 604 for a smartphone may indicate a first set of dimensions for an associated touchscreen display, while a device characteristic 604 for a tablet computer may indicate different dimensions for an associated touchscreen display. In some implementations, one or more device characteristics 604 may be determined from sources other than the touch data 106 or other input data. For example, the touch data 106 may indicate a device type associated with a device 102, such as a particular model of smartphone, and based on the device type, other hardware and software components associated with the device 102 may be determined based on other sources of device data. As another example, device data may associate device identifiers 602 for particular devices 102 with corresponding device data that indicates the device characteristics 604 of the device 102. Continuing the example, based on a device identifier 602, such as a device name or network address, corresponding device characteristics 604 for the identified device 102 may be determined without the device characteristics 604 being indicated in the touch data 106 or other input data.

The touch data 106 or other input data may also include time data 606 indicative of a time at which input to a particular coordinate or set of coordinates was received. Time data 606 may include a timestamp generated by a clock associated with the device 102 receiving the touch input 104 or with another computing device in communication therewith. In other implementations, time data 606 may include a relative indication of time. For example, each successive coordinate to which input is received may be associated with sequential numbers. In still other implementations, touch data 106 or other input data may not necessarily include an indication of the time that the input to a coordinate was received, and a position server 108 or other computing device receiving the touch data 106 or other type of input data may determine a time at which the data was received.

In some implementations, the touch data 106 or other type of input data may include one or more input characteristics 608, such as characteristics of the touch input 104 or other type of input provided to a device 102. For example, input characteristics 608 may include an input type associated with the touch input 104 or other type of input. An input type may include an indication of the source of the touch input 104, such as a touch gesture or a near-touch provided by a finger or other portion of a user's body, or contact or a near-touch associated with a stylus, pointer, or pen. As described previously input may also be provided using a game controller, light element, or camera, or any other type of device that may provide input that indicates a specific portion of a display area, in addition to or in place of touch input 104. For example, an external device may be used to draw a path over the display areas of multiple devices 102, while a camera or other type of sensor determines the particular coordinates indicated by the path. Other types of input may include use of light-projecting devices, game controllers, or other types of devices that may provide a detectable signal or other indication of a portion of a display. For example, a controller used to indicate a path that passes over the display areas of multiple devices 102 may include one or more of a gyroscope, accelerometer, motion sensor, or other types of internal sensors that may detect the position and orientation of the device. Input characteristics 608 may also include an indication of whether a touch sensor of a device 102 is currently receiving touch input 104, and in some cases, an indication of a speed, force, direction, or length of time associated with a touch input 104. Input characteristics 608 may also include an indication of whether other types of input are currently being received by a device 102.

Other touch data 610 may include information regarding a user account associated with a device 102, data from device sensors, such as a gyroscope, accelerometer, or camera, location data from the device 102 or a positioning system indicating the physical location of the device 102, data regarding the type of content to be presented by the devices 102, and so forth.

Device position data 110 may be generated based at least in part on touch data 106 or other types of input data received from a device 102. Device position data 110 may indicate the relative position of a device 102 with regard to one or more other devices 102. For example, touch data 106 may be used to determine the order in which the touch sensors of a group of devices 102 receive input, which may in turn indicate the order in which the devices 102 are arranged and the particular devices 102 that are adjacent to one another. Device position data 110 may also indicate the alignment with regard to adjacent devices 102. For example, the alignment between two adjacent devices 102 may be based on one or more sets of touch coordinates 206 that are positioned at adjacent borders of a touch sensor.

As such, device position data 110 associated with a particular device 102 may include a device identifier 602 indicative of the particular device 102 and in some implementations, an indication of one or more device characteristics 604. The device position data 110 may also include an indication of one or more adjacent devices 612. Adjacent devices 612 may include devices that received touch input 104 immediately prior to and immediately subsequent to the particular device 102.

The device position data 110 may also indicate an alignment determination 614. As described previously, the alignment between two devices 102 may be based on one or more sets of touch coordinates 206 that are positioned at adjacent borders of the devices 102. For example, as described with regard to FIGS. 1-4, multiple sets of adjacent touch coordinates 206 positioned at the borders of a touch sensor may be used to determine the alignment between the devices 102. In some implementations, the alignment determination 614 may further be generated based on other touch coordinates 206, which may define an alignment line 302, as described with regard to FIG. 3, or based on other types of input data, such as data determined using cameras or other types of input that indicates portions of a display area.

Other position data 616 may include data from device sensors, such as a gyroscope, accelerometer, or camera, location data from the device 102 or a positioning system indicating the physical location of the device 102, and so forth. Other position data 616 may also include data determined based on network associations of devices 102, such as IP addresses or other network identifiers of a device 102. In some implementations, other position data 616 may include data obtained from signals received by the devices 102. For example, Wi-Fi service set identifiers (SSIDs) broadcasts, Bluetooth beacons, signals from radio frequency identification (RFID) devices, and so forth may be used to determine particular devices 102 that are proximate to one another. Continuing the example, two devices 102 that are able to detect the same or a similar set of SSIDs and Bluetooth beacons may be deemed proximate to each other. In other examples, other signals may be used. For example, an acoustic signal may be detected by a microphone on the device 102, modulated light may be detected by a light sensor or camera on the device 102, and so forth.

Figure 7:
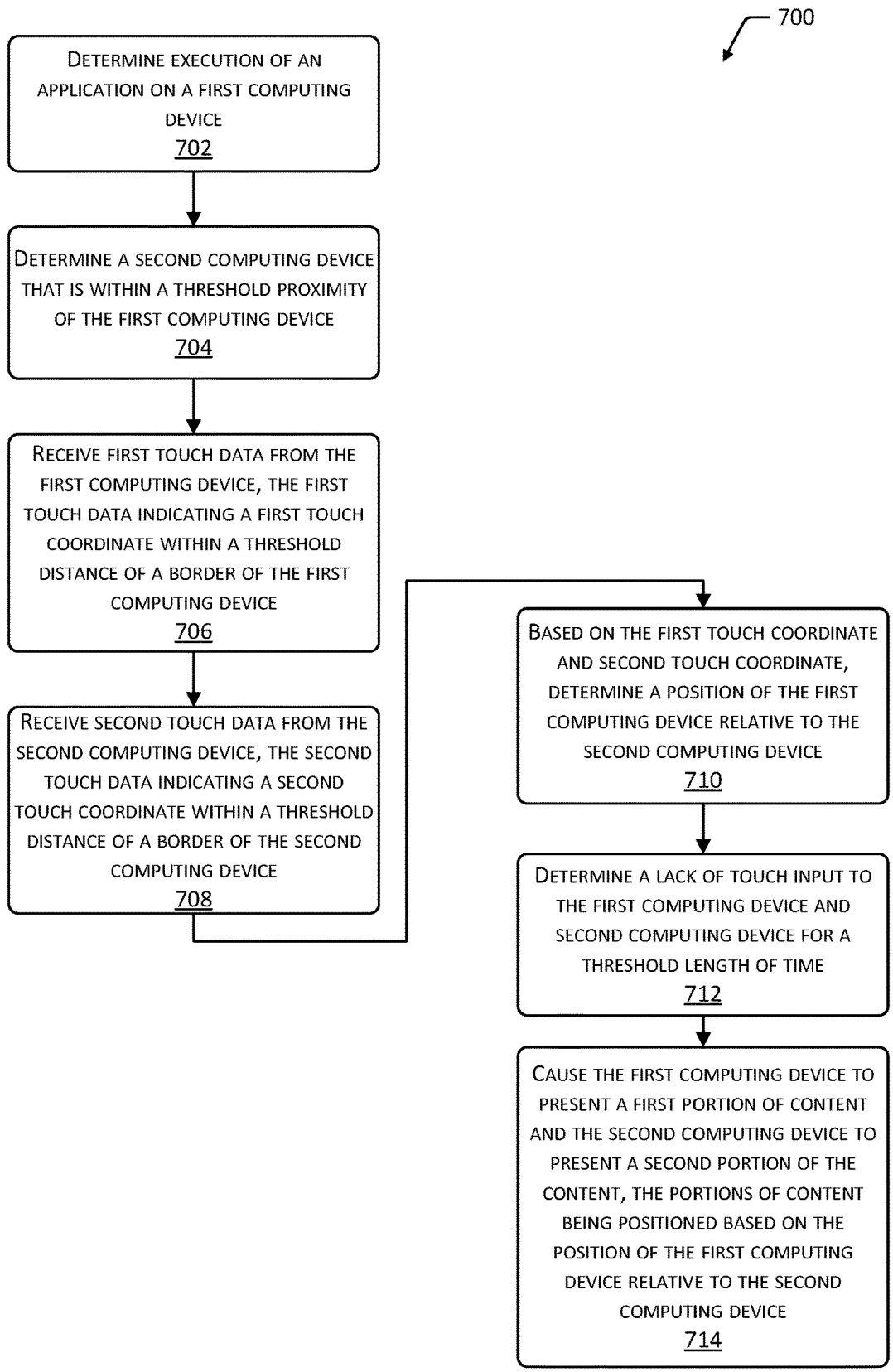
FIG. 7 is a flow diagram illustrating one implementation of a method for determining relative alignment of computing devices based on touch data.

FIG. 7 is a flow diagram 700 illustrating one implementation of a method for determining relative alignment of computing devices based on touch data 106. In other implementations, other types of input data in addition to or in place of touch data 106 may be generated and used. As described previously, any type of input data that indicates a portion of a display area may be used to determine relative alignment between computing devices. At 702, execution of an application on a first computing device may be determined. For example, a process for determining the position and alignment of a first computing device relative to other computing devices may be initiated by executing an application for receiving touch input 104 or other types of input, generating touch data 106 or other types of input data, and transmitting the touch data 106 or input data to a position server 108. In other implementations, the application may be configured to determine device position data 110 based on the touch data 106 or other input data generated by the first computing device or received from other computing devices. In some implementations, each computing device to be used to present a portion of related content may execute an application to begin a process for determining the position and alignment of the computing devices. In other implementations, the first computing device may execute an application, and other computing devices that are proximate to the first computing device may be detected.

At 704, a second computing device that is within a threshold proximity of the first computing device may be determined. While FIG. 7 describes determining proximity of a second computing device to a first computing device, the techniques described herein may be used with any number of additional computing devices. In some implementations, determining that the second computing device is within a threshold proximity may include use of geolocation technology. For example, a global positioning system (GPS) or another source of location data may be used to determine a physical location of the first computing device and the second computing device. The physical locations of each computing device may then be determined to be within a threshold proximity of one another. In other implementations, determining that the second computing device is within a threshold proximity may include determining network addresses for the first computing device and the second computing devices, which may indicate that the computing devices are associated with the same local area network (LAN) or other type of network. In some cases, proximity between computing devices may be determined based on signals received by the computing devices, such as by comparing SSIDs for the networks detectable by each computing device. In still other implementations, the second computing device may be determined to be within a threshold proximity of the first computing device based on the time at which touch input 104 or other types of input is received by each computing device or the time at which touch data 106 or other types of input data is received from each computing device. For example, if touch data 106 is received from the second computing device within a threshold length of time from the time at which touch data 106 was received from the first computing device, this may indicate that the computing devices are within a threshold proximity of one another. In some cases, a combination of techniques may be used to determine proximity of computing devices. For example, the second computing device may be determined to be within a threshold proximity of the first computing device if the two computing devices have network addresses associated with the same network and touch data 106 is received from each of the computing devices within a threshold length of time.

At 706, first touch data 106 may be received from the first computing device. The first touch data 106 may indicate a first touch coordinate 206 that is within a threshold distance of a border of the first computing device. As described previously, touch data 106 may be generated in response to a touch or near-touch associated with a touch sensor, or any other type of input that indicates a particular coordinate or location within a display area. For example, the first computing device may receive touch input 104, such as a touch gesture, that provides input to one or more coordinates of a touch sensor. At least one touch coordinate 206 may be within a threshold distance of a border of the touch sensor. As described with regard to FIGS. 1-4, in some cases, the touch input 104 may include a touch gesture that crosses from a touch sensor of the first computing device to the touch sensor of the second computing device.

At 708, second touch data 106 may be received from the second computing device. The second touch data 106 may indicate a second touch coordinate 206 that is within a threshold distance of a border of the second computing device. For example, as described with regard to FIGS. 2-4, a touch gesture or other type of touch input 104 may move generally continuously from a first computing device to an adjacent computing device to provide input to the touch sensor of the adjacent computing device. As such, the touch input 104 may provide input to at least one touch coordinate 206 of the second computing device that is proximate to the border of the touch sensor.

At 710, based on the first touch coordinate 206 and second touch coordinate 206, a position of the first computing device relative to the second computing device may be determined. As described previously, device position data 110 indicating the position of the first and second computing devices relative to one another and the alignment between the two computing devices may be generated based on the touch data 106 or other type of input data received from each of the computing devices. In some cases, a sequence in which touch data 106 or other input data is received from computing devices may be used to determine the particular computing devices that are adjacent and the order in which the computing devices are arranged. For example, if first touch data 106 is received from a first computing device, second touch data 106 from a second computing device, then third touch data 106 from the first computing device, this may indicate that two adjacent computing devices are used. Continuing the example, receipt of additional touch data 106 from the first computing device from which touch data 106 was received may indicate that each computing device that is in use has received touch input 104. The location of the particular touch coordinates 206 proximate to the borders of the computing devices that received input may be used to determine the relative alignment between computing devices. For example, as described with regard to FIG. 2, if a first touch coordinate 206 at a border of a first computing device receives input and a second touch coordinated 206 at an adjacent border of a second computing device receives input, the two touch coordinates 206 may be assumed to be in approximate alignment. If additional touch input 106 is received to additional touch coordinates 206 proximate to the adjacent borders of the computing devices, the additional touch coordinates 206 may be used to increase the precision of the determined alignment. For example, if multiple sets of adjacent touch coordinates 206 along adjacent borders of the computing devices are determined, the average lateral offset between coordinates may be used to increase the precision of the determined alignment between the computing devices. Additionally, in some implementations, input to touch coordinates 206 other than those proximate to the border of a computing device may be used to determine an approximate direction in which a touch gesture or other type of touch input 104 is provided. For example, as described with regard to FIG. 3, multiple touch coordinates 206 that receive input may be used to determine an alignment line 302, which may in turn be used to determine the approximate offset between a touch coordinate 206 proximate to a border of a first computing device and a touch coordinate 206 proximate to an adjacent border of a second computing device.

At 712, a lack of touch input 104 to the first computing device and second computing device, or a lack of other types of input indicative of portions of the display areas of the computing devices, may be determined for a threshold length of time. For example, the process of determining the position and alignment of the computing devices may be concluded when no additional touch input 104 is received by any of the computing devices for a selected length of time, such as two seconds. In other implementations, the process may be completed when no additional touch input 104 is received by a particular computing device for a threshold length of time, or for at least a threshold portion of the computing devices. In some implementations, the threshold length of time may be determined based on characteristics of one or more of the computing devices. For example, providing touch input 104 that crosses the entire display area of a computing device having a large touchscreen display may occur over a longer period of time than providing touch input 104 that crosses a smaller display area. Therefore, the threshold length of time associated with a lack of touch input 104 to a computing device adjacent to a computing device having a large touchscreen display may be increased to account for the longer period of time that touch input 104 may be provided to the larger display area. In other implementations, the process may be completed when touch input 104 is received by the same computing device at which the touch input 104 originated, or by a computing device that has already received touch input 104.

At 714, the first computing device may be caused to present a first portion of content and the second computing device may be caused to present a second portion of the content. The portions of the content that are presented by each computing device may be positioned based on the position of the first computing device relative to the second computing device determined at 710. In some implementations, content to be presented by the computing devices may be received from a content server 112 or other computing device. In other implementations, the computing devices may, themselves, store the content for presentation. In some cases, original content may be modified, such as by dividing the content into respective portions for presentation using multiple computing devices. For example, as shown in FIGS. 1 and 5, content may include image data 114 in which each computing device presents a portion of an image represented by the image data 114. In some cases, each computing device may be provided with the portion of the content to be presented. As another example, content provided to each computing device may include portions of data associated with a community shopping application, such as data indicative of an item for purchase or a list of items to be purchased, such as an electronic shopping list or gift registry. In other cases, each computing device may be provided with the entirety of the content and the computing device may present the associated portion of the content. The manner in which the portion of the content is positioned within a display area of a computing device may be determined based on the determined position and alignment of the computing device relative to other computing devices. For example, as shown in FIGS. 1 and 4, portions of an image or another type of content may be positioned in the display area of a computing device in a manner that aligns with the portions of the image or other type of content presented in the display areas of adjacent computing devices, such that the entirety of an image is presented using a larger display area formed by the adjacent display areas of each computing device. In some implementations, the determined position and alignment of computing devices may be used to transfer content between the computing devices. For example, after positioning two computing devices adjacent to one another and determining the relative position or alignment between the computing devices, a touch input 104 may be used to select data and initiate transfer of the data from one computing device to another computing device. Continuing the example, a swipe gesture or other type of touch gesture that extends from the touchscreen display of a first computing device to that of a second computing device may be used to initiate transfer of selected content to the second device. In some cases, the transmission of content between computing devices may be limited to touch gestures that cross within a threshold distance of a selected border of a touch sensor. For example, a touch gesture that crosses the top border of a first computing device and the adjacent top border of a second computing device may be used to initiate transfer of data from the first computing device to the second computing device, while other touch gestures may perform other functions.

Figure 8:
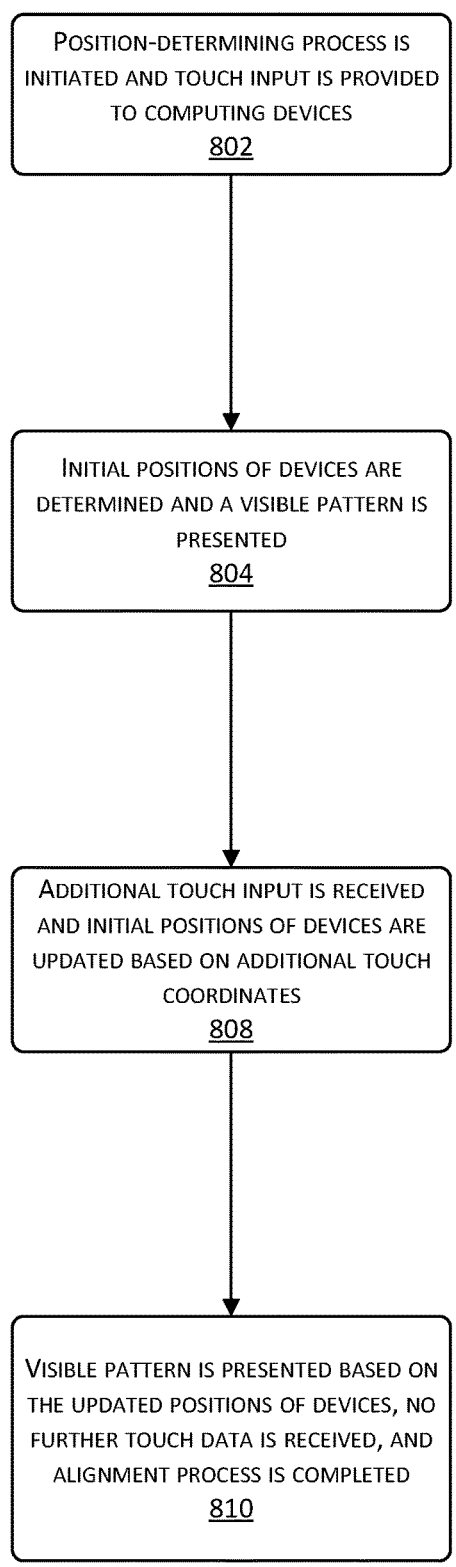
FIG. 8 is a series of diagrams illustrating a method for indicating an initial determined alignment of computing devices to solicit additional input, and determining a modified alignment based on the input.
Figure 8:
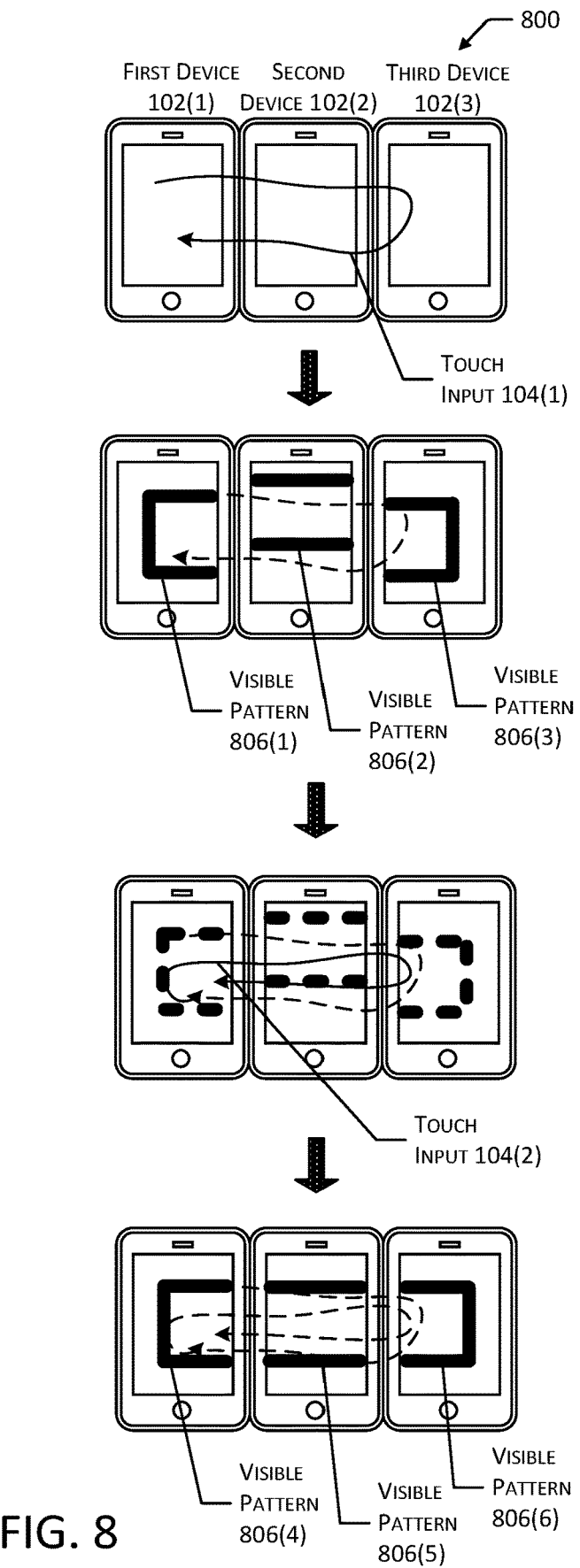

FIG. 8 is a series of diagrams 800 illustrating a method for indicating an initial determined alignment of computing devices to solicit additional input, and determining a modified alignment based on the input. At 802, a position-determining process may be initiated, and touch input 104 or another type of input may be provided to one or more computing devices. For example, FIG. 8 depicts a first device 102(1), second device 102(2), and third device 102(3) positioned in a generally horizontal arrangement, with touch input 104(1) provided to the devices 102. The touch input 104(1) may include a touch gesture or other type of input that provides input to the touch sensors associated with each of the devices 102. For example, FIG. 8 depicts the touch input 104(1) initiating at a touchscreen display of the first device 102(1), moving laterally to contact the touchscreen displays of the second device 102(2) and third device 102(3) in sequence, then moving laterally in the opposite direction to contact the touchscreen displays of the second device 102(2) and first device 102(1) in sequence. As described with regard to FIG. 7, in some implementations, initiation of the position-determining process may include execution of an application on one or more of the devices 102. In other implementations, positioning the devices 102 adjacent to or abutting one another or in a particular arrangement may cause the position determining process to be initiated.

At 804, initial positions of the devices 102 may be determined, and a visible pattern 806 may be presented on the displays of the devices 102. For example, an alignment of the devices 102 may be determined based on coordinates of the devices 102 to which input is received, as described with regard to FIGS. 1-7. The visible pattern 806 may include any type of visible output that may indicate the determined alignment of the devices 102. For example, FIG. 8 depicts the visible pattern 806 as a rectangular shape having a portion depicted on the displays of each of the devices 102, such that the alignment of the portions of the visible pattern 806 may be used to determine the accuracy of the determined alignment for the devices 102. Specifically, a first portion of the visible pattern 806(1) may be presented by the first device 102(1), a second portion of the visible pattern 806(2) may be presented by the second device 102(2), and a third portion of the visible pattern 806(3) may be presented by the third device 102(3). As shown in FIG. 8, in some cases, an initial alignment determined between devices 102 may be potentially inaccurate. For example, an initial touch input 104(1) may include input to a relatively small number of touch coordinates 206 proximate to the borders of the devices 102. In cases where adjacent sets of touch coordinates 206 in adjacent devices 102 are misaligned, such as due to the direction or shape of a touch gesture, the determined alignment may be affected by the misalignment of the touch coordinates 206. In such a case, the portions of the visible pattern 806 that are presented may appear misaligned, which may function as visible feedback to a user providing the touch input 104(1). In such a case, the user may continue to provide additional touch input 104(2).

For example, at 808, additional touch input 104(2) may be received, and the initial positions of the device may be updated based on additional touch coordinates 206 determined from the additional touch input 104(2). Continuing the example, FIG. 8 depicts additional touch input 104(2) that transitions from the touch sensor of the first device 102(1) to the second device 102(2), then the third device 102(3), then returns to the second device 102(2), then the first device 102(1). While FIG. 8 conceptually divides the initial touch input 104(1) from the additional touch input 104(2), in some cases, the touch input 104 may include a single, continuous input. For example, a user may provide a touch gesture to the devices 102, the visible pattern 806 may be presented, and based on the appearance of the visible patter 806, the user may continue the touch gesture without necessarily ceasing to provide touch input 104 before initiating an additional input. Based on additional touch coordinates 206 determined from the additional touch input 104(2), as well as the initial touch input 104(1), the position and alignment of the devices 102 may be determined. The position and alignment determined at 808 may be more accurate than the initial determination due to the acquisition of a larger number of touch coordinates 206.

At 810, the visible pattern 806 may be presented based on the updated positions of the devices 102. If no further touch data 106 or other input data is received, the alignment process may be completed. Subsequently, content may be presented by the devices 102 based on the determined alignments and positions thereof. For example, FIG. 8 depicts the first device 102(1) presenting a respective portion of the visible pattern 806(4), the second device 102(2) presenting a respective portion of the visible pattern 806(5), and the third device 102(3) presenting a respective portion of the visible pattern 806(6). Based on the updated alignment determination for the devices 102, the portions of the visible pattern 806 presented at 810 may appear in alignment. Based on the appearance of the visible pattern 806, a user may cease providing touch input 104 or other input to the devices 102. When no touch data 106 or other input data is received for at least a threshold length of time, the position-determining process may be concluded, and content may be presented using the devices 102.

Figure 9:
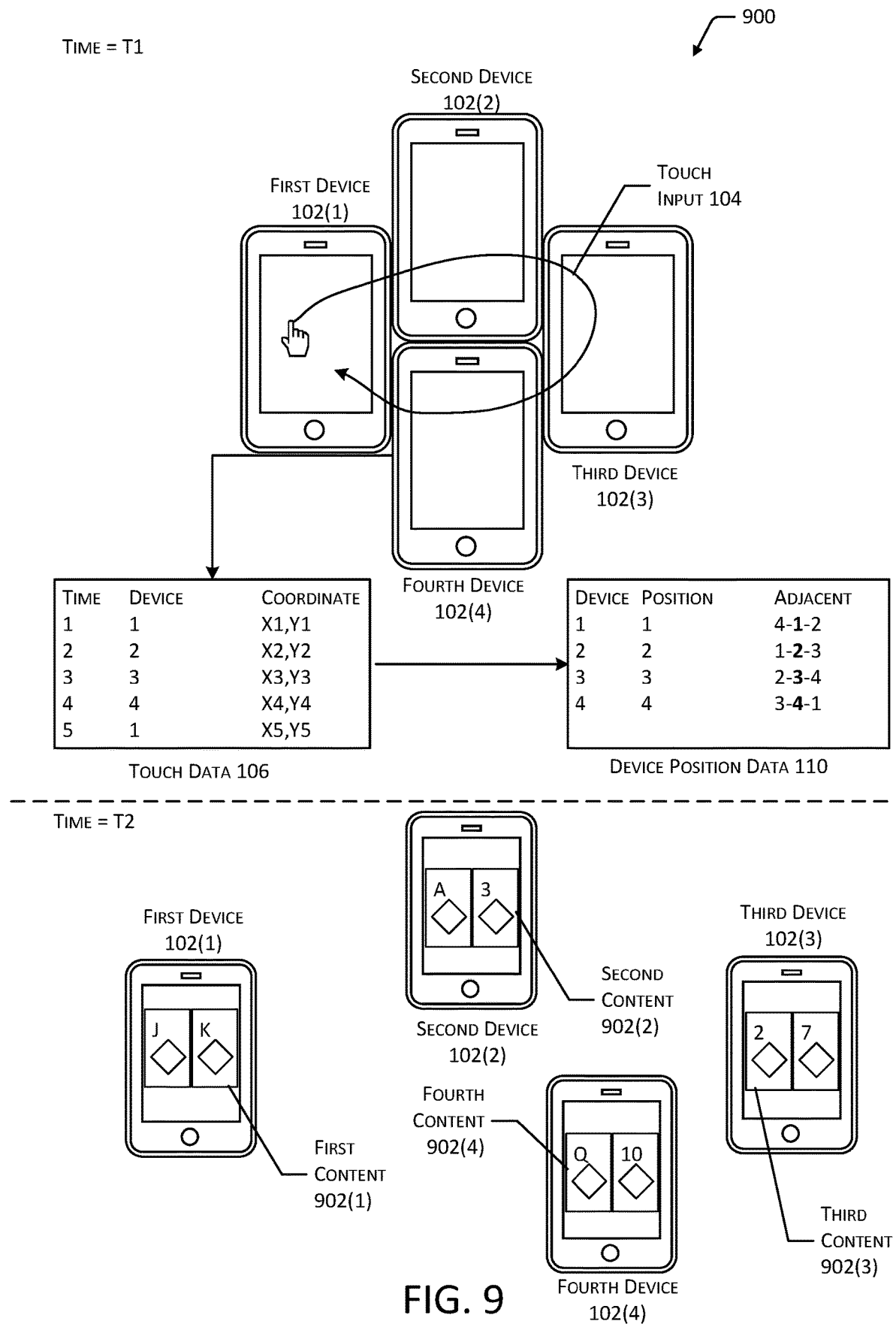
FIG. 9 illustrates a method for determining relative positions of computing devices based on touch data received from the computing devices.

FIG. 9 is a diagram 900 illustrating a method for determining relative positions of computing devices based on touch data 106 or other types of input data received from the computing devices. In some cases, the position of a particular device 102 relative to other devices 102 may be used to provide a respective portion of content to each of the devices 102, independent of the alignment of the devices 102. For example, multiple users may play a card game or other type of multiplayer game using computing devices, such as smartphones. In such a case, the position of each device 102 relative to one or more other devices 102 may be relevant. For example, if one user is sitting immediately to the right or left, or immediately across from another user, based on the determined position of the device 102 associated with the user, this may affect the particular content that is provided to that user's device 102, the time at which the content is provided, and so forth.

To determine the relative positions between devices 102, at a first time T1, multiple devices 102 may be placed in proximity to one another. For example, FIG. 9 depicts a first device 102(1), a second device 102(2), a third device 102(3), and a fourth device 102(4) positioned adjacent to one another. In other implementations, the devices 102 may not necessarily be adjacent, but may be associated with the same network or determined to be within a threshold distance of one another based on geolocation data. A touch input 104 may be provided to each of the devices 102. In some implementations, the touch input 104 may include a generally continuous touch gesture that contacts a touch sensor of each device 102. For example, FIG. 9 depicts the touch input 104 as a touch gesture having a generally circular shape that is initiated at the first device 102(1), then passes to the second device 102(2), then the third device 102(3), then the fourth device 102(4), at which point the touch gesture returns to the first device 102(1). In response to a second instance of touch input 104 being received by the first device 102(1), the process may be concluded and the relative positions of the devices 102 may be determined. In other implementations, the relative positions of the devices 102 may be determined if no touch input 104 is received by the devices 102 for at least a threshold length of time. While FIG. 9 depicts the touch input 104 as a generally continuous touch gesture, in other implementations, the touch input 104 may include discrete inputs. For example, the touch input 104 may include touch or tap gestures provided to each of the devices 102 in sequence. In other implementations, other types of input in addition to or in place of touch input 104 may be received, such as input associated with a camera, game controller, or other type of device that may be used to indicate a portion of a display area or determine a portion of a display area that is indicated by a user or device 102.

As described with regard to FIG. 1, each device 102 may provide touch data 106 or another type of input data that includes a device identifier 602, and in some implementations, an indication of a time at which input was received and an indication of the coordinates to which the input was received. In other implementations, the touch data 106 or other input data may simply indicate the device identifier 602 and an indication that the device 102 received input, and a separate computing device, such as a position server 108, may determine the time that the touch data 106 or other input data was received. Based on the touch data 106 or other input data, a position server 108, one of the devices 102, or another computing device that receives the data may determine device position data 110 that indicates the relative positions of each of the devices 102. For example, FIG. 9 depicts the device position data 110 indicating that the first device 102(1) is preceded by the fourth device 102(4) and followed by the second device 102(2), the second device 102(2) is preceded by the first device 102(1) and followed by the third device 102(3), the third device 102(3) is preceded by the second device 102(2) and followed by the fourth device 102(4), and the fourth device 102(4) is preceded by the third device 102(3) and followed by the first device 102(1). The relative positions of the devices 102 may be determined based on the times at which touch data 106 or other input data is received from each device 102, relative to the times at which the touch data 106 or other input data is received from each other device 102.

At a second time T2, content may be presented by each of the devices 102 based on the determined positions of the devices 102 indicated in the device position data 110. Specifically, FIG. 9 depicts first content 902(1) presented by the first device 102(1), second content 902(2) presented by the second device 102(2), third content 902(3) presented by the third device 102(3), and fourth content 902(4) presented by the fourth device 102(4). The particular portion of content 902 that is presented by each device 102 and the time at which the portion of the content 902 is presented may be determined by the device position data 110. For example, the content 902 may be associated with a card game or other type of multiplayer game, and the time at which the content 902 is presented by a particular device 102 may depend on a turn order associated with the game, which may be determined by the position of a device 102 relative to other devices 102.

Figure 10:
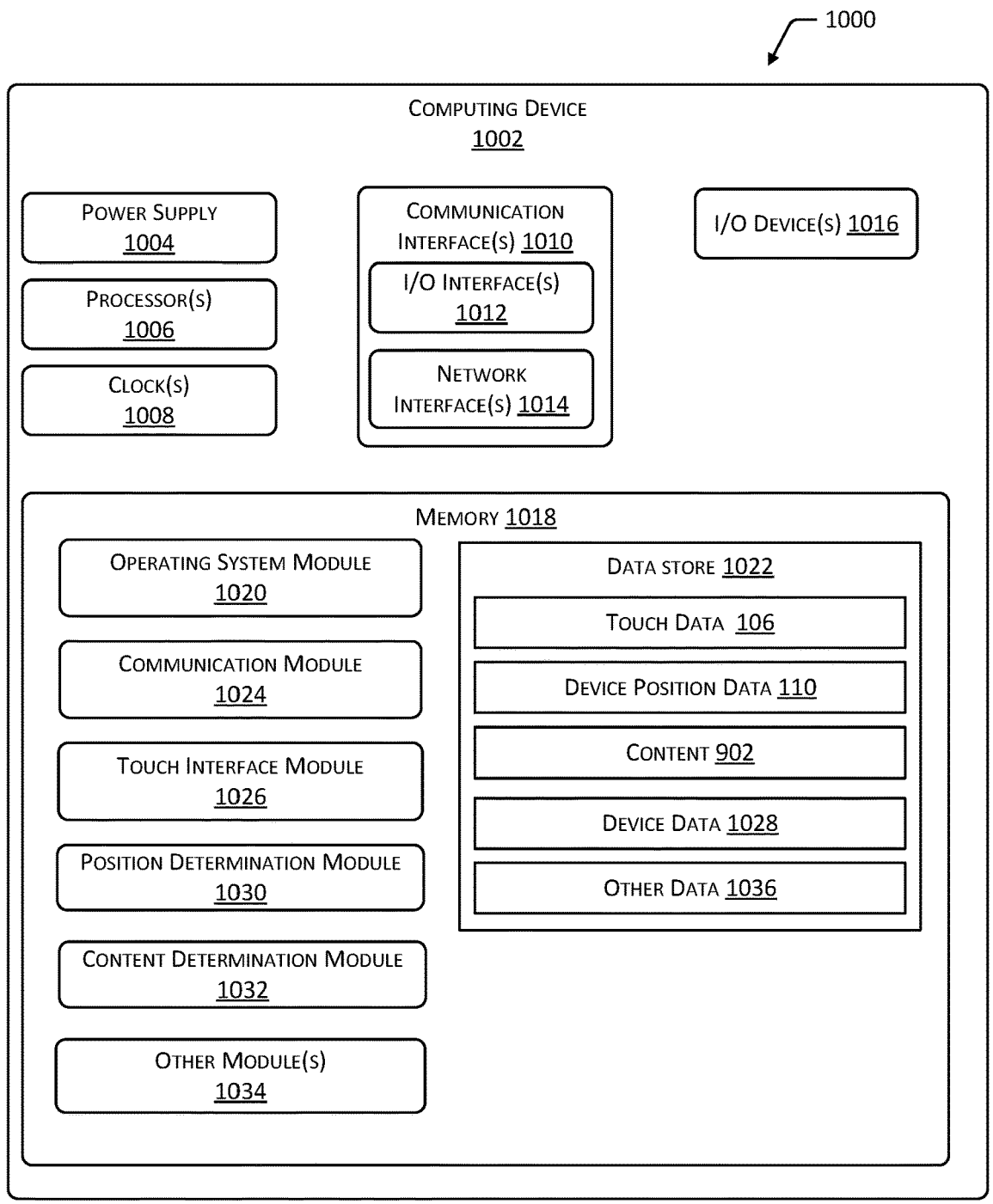
FIG. 10 is a block diagram depicting an implementation of a computing device within the present disclosure.

FIG. 10 is a block diagram 1000 depicting an implementation of a computing device 1002 within the present disclosure. The computing device 1002 may include a device 102 that receives touch input 104 or other types of input and generates touch data 106 or other types of input data, a position server 108, a content server 112, or one or more other computing devices 1002 in communication with a device 102, position server 108, or content server 112. While FIG. 10 depicts a single block diagram 1000 of a computing device 1002, any number and any type of computing devices 1002 may be used to perform the functions described herein. For example, as described with regard to FIG. 1, a group of devices 102 may receive touch input 104 or other types of input, and generate touch data 106 or other types of input data, which is provided to a position server 108 that determines device position data 110 based on the touch data 106 or other types of input data. A content server 112 may then determine particular content 902 to be provided to each device 102 based on the device position data 110. However, in other implementations a single device 102 or group of devices 102 that receive input may generate input data and also determine device position data 110 based on the input data. The device(s) 102 may then access and process stored content 902 for presentation using a group of devices 102. Any combination of devices 102 that receive touch input 104 or other types of input, servers, and other computing devices 1002 may be used to perform the functions described herein.

One or more power supplies 1004 may be configured to provide electrical power suitable for operating the components of the computing device 1002. In some implementations, the power supply 1004 may include a rechargeable battery, fuel cell, photovoltaic cell, power conditioning circuitry, and so forth.

The computing device 1002 may include one or more hardware processor(s) 1006 (processors) configured to execute one or more stored instructions. The processor(s) 1006 may include one or more cores. One or more clock(s) 1008 may provide information indicative of date, time, ticks, and so forth. For example, the processor(s) 1006 may use data from the clock 1008 to generate a timestamp, trigger a preprogrammed action, and so forth. Continuing the example, data from a clock 1008 may be used to determine a time when a touch input 104 to a particular touch coordinate 206 is received, passage of a length of time during which no touch input 104 has been received, lengths of time between receipt of touch inputs 104 by successive devices 102 that may be used to determine that the devices 102 are proximate to one another, and so forth.

The computing device 1002 may include one or more communication interfaces 1010, such as input/output (I/O) interfaces 1012, network interfaces 1014, and so forth. The communication interfaces 1010 may enable the computing device 1002, or components of the computing device 1002, to communicate with other computing devices 1002 or components of the other computing devices 1002. The I/O interfaces 1012 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1012 may couple to one or more I/O devices 1016. The I/O devices 1016 may include any manner of input devices or output devices associated with the computing device 1002. For example, I/O devices 1016 may include touch sensors, displays, touch sensors integrated with displays (e.g., touchscreen displays), keyboards, mouse devices, microphones, image sensors, cameras, scanners, speakers, haptic devices, printers, and so forth. In some implementations, the I/O devices 1016 may be physically incorporated with the computing device 1002. In other implementations, I/O devices 1016 may be externally placed.

The network interfaces 1014 may be configured to provide communications between the computing device 1002 and other devices, such as the I/O devices 1016, routers, access points, and so forth. The network interfaces 1014 may include devices configured to couple to one or more networks including local area networks (LANs), wireless LANs (WLANs), wide area networks (WANs), wireless WANs, and so forth. For example, the network interfaces 1014 may include devices compatible with Ethernet, Wi-Fi, Bluetooth, ZigBee, Z-Wave, 3G, 4G, LTE, and so forth.

The computing device 1002 may include one or more busses or other internal communications hardware or software that allows for the transfer of data between the various modules and components of the computing device 1002.

As shown in FIG. 10, the computing device 1002 may include one or more memories 1018. The memory 1018 may include one or more computer-readable storage media (CRSM). The CRSM may be any one or more of an electronic storage medium, a magnetic storage medium, an optical storage medium, a quantum storage medium, a mechanical computer storage medium, and so forth. The memory 1018 may provide storage of computer-readable instructions, data structures, program modules, and other data for the operation of the computing device 1002. A few example modules are shown stored in the memory 1018, although the same functionality may alternatively be implemented in hardware, firmware, or as a system on a chip (SoC).

The memory 1018 may include one or more operating system (OS) modules 1020. The OS module 1020 may be configured to manage hardware resource devices such as the I/O interfaces 1012, the network interfaces 1014, the I/O devices 1016, and to provide various services to applications or modules executing on the processors 1006. The OS module 1020 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 1022 and one or more of the following modules may also be associated with the memory 1018. The modules may be executed as foreground applications, background tasks, daemons, and so forth. The data store(s) 1022 may use a flat file, database, linked list, tree, executable code, script, or other data structure to store information. In some implementations, the data store(s) 1022 or a portion of the data store(s) 1022 may be distributed across one or more other devices including other computing devices 1002, network attached storage devices, and so forth.

A communication module 1024 may be configured to establish communications with one or more other computing devices 1002. Communications may be authenticated, encrypted, and so forth.

The memory 1018 may also store a touch interface module 1026. The touch interface module may receive touch input 104 using a touch sensor or other type of input device, such as a camera, projector system, and so forth. The touch input 104 may indicate one or more touch coordinates 206, which may correspond to locations within a display area. The touch interface module 1026 may generate touch data 106 based on the touch input 104. As described with regard to FIG. 6, touch data 106 may include a device identifier 602 indicative of the computing device 1002 receiving the touch input 104, an indication of the touch coordinates 206, and in some implementations, an indication of one or more device characteristics 604 such as display dimensions, time data 606 indicative of a time that the touch input 104 was received, or input characteristics 608 indicative of a time, speed, direction, force, type, or other characteristic of the touch input 104. For example, the I/O devices 1016 may include one or more device sensors that may be used to determine input characteristics 608. In some implementations, device characteristics 604 for a particular computing device 1002 may be determined separately from the touch data 106. For example, the touch data 106 may indicate a device identifier 602 indicative of the computing device 1002 receiving the touch input 104, and a computing device 1002 that receives the touch data 106 may access device data 1028, which associates device identifiers 602 with device characteristics 604. In other implementations, the touch data 106 may indicate a device type associated with the computing device 1002 receiving the touch input 104, and the device data 1028 may associate device types with device characteristics 604. In other implementations, other types of modules in addition to or in place of the touch interface module 1026 may be used to receive other types of input that indicate portions of a display area and generate other types of input data based on the received input. For example, data received from a camera, game controller, or other type of device that detects a signal or determines an indicated portion of a display area may be used to generate input data, which in turn may be used to determine the position and alignment of computing devices 1002 relative to one another.

The memory 1018 may also store a position determination module 1030. The position determination module 1030 may generate device position data 110 based on touch data 106 or other input data received from one or more computing devices 1002. As described with regard to FIGS. 6 and 9, device position data 110 may include an indication of adjacent devices 612 that are proximate to a particular computing device 1002 and an alignment determination 614 indicating the specific position of a display area of a computing device 1002 relative to the display area of another computing device 1002. For example, the position determination module 1030 may determine that a group of computing devices 1002 are within proximity of one another using location data, such as data determined from a GPS or other type of geolocation system, network data, such as network addresses for each computing device 1002 indicating an association with the same network, times at which touch input 104 or other types of input are received by each computing device 1002 or touch data 106 or other types of input data are received from each computing device 1002, or combinations thereof. Continuing the example, if touch data 106 or other input data is received from each computing device 1002 within a group within a threshold length of time, the position determination module 1030 may determine that the computing devices 1002 are within a threshold proximity of one another. In some implementations, computing devices 1002 may be determined to be within proximity of one another based on the signals detected by the computing devices 1002. For example, a computing device 1002 may receive SSID broadcasts or other types of signals from a Wi-fi network, Bluetooth beacons from a Bluetooth network, RFID signals from an RFID device, and so forth. As other examples, computing devices 1002 may detect acoustic signals using a microphone, light signals using a camera or image sensor, and so forth. If multiple computing devices 1002 receive the same signals or sets of signals within a threshold level of similarity of one another, the computing devices 1002 may be proximate to one another. Additionally, the position determination module 1030 may determine the relative positions of the computing devices 1002, such as which of the computing devices 1002 are adjacent to one another, based on the times at which touch data 106 or other input data is received from each computing device 1002. For example, as described with regard to FIG. 9, touch input 104 may be provided to multiple computing devices 1002 in succession, and device position data 110 indicating the computing devices 1002 that precede and follow each computing device 1002 may be generated. The position determination module 1030 may also determine the alignment between adjacent computing devices 1002. For example, as described with regard to FIGS. 2-4, touch coordinates 206 that receive input and are within a threshold distance of adjacent borders of computing devices 1002 may be used to determine the relative position of the adjacent computing devices 1002 to one another. Determination of multiple sets of adjacent touch coordinates 206 may increase the accuracy of the determined alignment. In some implementations, as described with regard to FIG. 3, touch coordinates 206 that are not proximate to a border of a computing device 1002 may be used to generate an alignment line 302 indicative of a direction associated with a touch input 104, which may determine an offset between two touch coordinates 206 proximate to adjacent borders of computing devices 1002.

The memory 1018 may additionally store a content determination module 1032. The content determination module 1032 may provide particular portions of content 902 to particular computing devices 1002 based on the device position data 110. For example, as shown in FIGS. 1, 5, and 9, content 902 provided to each computing device 1002 may include particular portions of an image or video. In some implementations, the content determination module 1032 may process existing content 902, such as by dividing the content 902 into portions to be provided to respective computing devices 1002. The content determination module 1032 may determine the particular portions of content 902 to be provided to a computing device 1002, the particular time to provide the content 902, and the manner in which the content 902 is to be positioned within a display to align with content 902 presented using adjacent computing devices 1002 based on the device position data 110. For example, the device position data 110 may indicate which computing devices 1002 are adjacent, as well as the particular borders of each computing device 1002 that are adjacent to particular borders of other computing devices 1002. In addition to indicating adjacent borders, the device position data 110 may include an alignment determination 614 based on the particular touch coordinates 206 positioned at adjacent borders that are aligned with one another. In some implementations, the content determination module 1032, or another module, may be used to provide portions of a visible pattern 806 to respective computing devices 1002 to illustrate a determined alignment of the computing devices 1002, as described with regard to FIG. 8. In some implementations, the content determination module 1032 may be used to scale content 902 based on the dimensions or other characteristics of computing devices 1002. For example, if a first computing device 1002 having a larger display area is positioned adjacent to a second computing device 1002, content 902 provided to the first computing device 1002 may be scaled based on a difference between the dimensions of the display of the first computing device 1002 and the dimensions of the display of the second computing device 1002.

Other modules 1034 may also be present in the memory 1018. For example, location modules may be used to determine locations of computing devices 1002, such as by accessing a GPS system or other source of location data. User input modules may be used to receive user input interacting with computing devices 1002. Applications may be used to initiate and complete processes for determining the positions and alignment of computing devices 1002. In some implementations, applications for determining the positions and alignment of computing devices 1002 may generate visible patters 806 during the alignment process, as described with regard to FIG. 8. Other modules 1034 may also include encryption modules to encrypt and decrypt communications between computing devices 1002, authentication modules to authenticate communications sent or received by computing devices 1002, a permission module to assign, determine, and manage user permissions to access or modify data associated with computing devices 1002. Other modules 1034 may also include modules for detecting characteristics of a computing device 1002, such as hardware or software components of a device 102, locations of a computing device 1002, and so forth.

Other data 1036 within the data store(s) 1022 may include configurations, settings, preferences, and default values associated with computing devices 1002. Other data 1036 may also include encryption keys and schema, access credentials, and so forth. Other data may include network data indicative of networks accessible to one or more computing devices 1002, rules or algorithms for modifying content 902 based on device characteristics 604, such as display dimensions, and based on the device position data 110.

In some implementations, other modules 1034 may include an authentication module that may be used to perform an authentication of a user based on touch input 104 received from computing devices 1002 associated with the user. For example, a computer-facilitated service may receive a request from a user account to access a resource provided by the computer-facilitated service. In response to the request, the computer-facilitated service may provide a request for information that may be used to perform an initial authentication of the user account or computing device 1002 used to request access to the resource. If the computer-facilitated service determines that additional authentication of the user is required, such as by accessing other data 1036, such as user profile data associated with the user device 102, the computer-facilitated service may determine one or more computing devices 1002 associated with the user account, as well as other services used by the user account. For example, the user profile data may indicate an authentication method that may be performed by each computing device 1002 and service indicated in the user profile data, as well as a rating indicating a level of trust for each authentication method. The computer-facilitated service may select an authentication method and a computing device 1002 or service to be used to perform the selected authentication method. The computer-facilitated service may then transmit a request to the selected computing device 1002 or service to prompt a user to perform the selected authentication method and provide an authenticated response. For example, the computer-facilitated service may determine that a user account is associated with multiple tablets, smartphones, smart televisions, and so forth. The authentication method may include a prompt to place the computing devices 1002 adjacent to one another in a selected orientation, such as placing a tablet to the left of a smartphone, rotated such that the top edge of the tablet is adjacent to the left edge of the smartphone. The prompt may also indicate a pattern to be drawn across the touchscreen displays of both computing devices 1002, or alternatively, a user may be prompted to draw a pre-defined pattern selected by the user. Receipt of touch data 106 from each computing device 1002 indicating that a touch input 104 corresponding to the expected pattern was received by each computing device 1002 in the expected order may be used to authenticate the request to access the resource. Additionally, the touch data 106 received during performance of the authentication process may be used to determine the relative position and alignment of the computing devices 1002 for other purposes, such as those described with regard to FIGS. 1 and 9.

In different implementations, different computing devices 1002 may have different capabilities or capacities. For example, position servers 108 and content servers 112 may have greater processing capabilities or data storage capacity than devices 102 that receive touch input 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
determine activation of an application on a first computing device having a first touchscreen display and a second computing device having a second touchscreen display;
determine that the first computing device is within a threshold proximity of the second computing device;
receive, from the first computing device, first touch data indicative of a touch input to the first touchscreen display, wherein the first touch data includes:
a first device identifier indicative of the first computing device;
a first touch coordinate within a threshold distance of a first border of the first touchscreen display; and
a second touch coordinate within the threshold distance of a second border of the first touchscreen display;
receive, from the second computing device, second touch data indicative of the touch input to the second touchscreen display, wherein the second touch data includes:
a second device identifier indicative of the second computing device;
a third touch coordinate within the threshold distance of a third border of the second touchscreen display, the third border being adjacent to the second border; and
a fourth touch coordinate within the threshold distance of a fourth border of the second touchscreen display;
determine, based on the second touch coordinate and the third touch coordinate, alignment data indicative of a relative position of the first touchscreen display with respect to the second touchscreen display;
cause the first touchscreen display to present a first portion of a visible pattern;
cause the second touchscreen display to present a second portion of the visible pattern, wherein the second portion of the visible pattern is positioned relative to the first portion of the visible pattern based on the alignment data;
determine a lack of touch input to the first touchscreen display and the second touchscreen display; and
cause the first touchscreen display to present a first portion of an image;
scale a second portion of the image based on a difference between a first physical dimension of the first touchscreen display and a second physical dimension of the second touchscreen display; and
cause the second touchscreen display to present the second portion of the image, wherein the second portion of the image is aligned relative to the first portion of the image based on the alignment data.

2. The system of claim 1, further comprising computer-executable instructions to:
determine one or more of:
a first physical location of the first computing device and a second physical location of the second computing device, wherein the first physical location is within the threshold proximity of the second physical location; or
a first network address associated with the first computing device and a second network address associated with the second computing device, wherein the first network address and the second network address indicate that the first computing device and the second computing device are associated with a same network;
wherein the first computing device is determined to be within the threshold proximity of the second computing device based on one or more of the first physical location, the second physical location, the first network address, or the second network address.

3. The system of claim 1, further comprising computer-executable instructions to:
determine passage of a threshold length of time; and
provide a first heartbeat signal to the first computing device and a second heartbeat signal to the second computing device, wherein the lack of touch input is determined in response to the first heartbeat signal and the second heartbeat signal.

4. A method comprising:
receiving, from a first computing device having a first touch sensor, first touch data indicating input at a first coordinate positioned within a threshold distance of a first border of the first touch sensor;
receiving, from a second computing device having a second touch sensor, second touch data indicating input at a second coordinate positioned within the threshold distance of a second border of the second touch sensor;
determining, based on the first coordinate and the second coordinate, a first alignment of the first touch sensor relative to the second touch sensor;
receiving third touch data from one or more of the first computing device or the second computing device, wherein the third touch data indicates one or more third coordinates positioned at one or more of the first border or the second border;
determining, based on the one or more third coordinates, a second alignment of the first touch sensor relative to the second touch sensor;
causing the first computing device to present a first portion of a visible output; and
causing the second computing device to present a second portion of the visible output, wherein the second portion of the visible output is aligned relative to the first portion of the visible output based on one or more of the first alignment or the second alignment.

5. The method of claim 4, further comprising:
prior to receiving the first touch data, receiving fourth touch data indicating input to a fourth coordinate of the first touch sensor; and
determining a line based on the fourth coordinate and the first coordinate;
wherein the first alignment of the first touch sensor relative to the second touch sensor is further determined based on a relationship between the second coordinate and the line.

6. The method of claim 4, further comprising:
prior to determining the first alignment, determining one or more of a first physical location of the first computing device or first network data indicative of a network associated with the first computing device;

determining one or more of a second physical location of the second computing device or second network data indicative of the network associated with the second computing device; and based on one or more of the first physical location, the second physical location, the first network data, or the second network data, determining that the first computing device is within a threshold proximity of the second computing device.

7. The method of claim 4, further comprising:

determining a first time associated with receipt of the first touch data;

determining a second time associated with receipt of the second touch data; and determining that the first time is within a threshold length of time of the second time.

8. The method of claim 4, further comprising:

determining a lack of input to the first touch sensor and the second touch sensor for a threshold length of time;

wherein the first alignment of the first touch sensor relative to the second touch sensor is determined in response to determining the lack of input for the threshold length of time.

9. The method of claim 4, further comprising:

receiving fourth touch data from a third computing device, wherein the fourth touch data indicates one or more fourth coordinates positioned on a third touch sensor of the third computing device; and determining, based on the one or more fourth coordinates, a third alignment of the third touch sensor relative to one or more of the first touch sensor or to the second touch sensor.

10. The method of claim 4, further comprising:

determining, based on the first touch data, input to the first touch sensor prior to the input to the first coordinate; and determining, based on the second touch data, a lack of input to the second touch sensor for a threshold length of time subsequent to the input to the second coordinate.

11. The method of claim 4, further comprising:

determining first device data indicative of a first dimension of the first touch sensor;

determining second device data indicative of a second dimension of the second touch sensor, wherein the first alignment is further determined based on the first dimension and the second dimension;

determining a difference between the first dimension and the second dimension; and scaling the second portion of the visible output based on the difference between the first dimension and the second dimension.

12. A system comprising:

one or more memories storing computer-executable instructions; and one or more hardware processors to execute the computer-executable instructions to:

receive, at a first time, from a first computing device having a first touch sensor, first touch data indicating input to a first coordinate of the first touch sensor;

receive, at a second time subsequent to the first time, from a second computing device having a second touch sensor, second touch data indicating input to a second coordinate of the second touch sensor;

determine a lack of input to the second touch sensor for at least a threshold length of time subsequent to the second time; and determine, based on the first touch data and the second touch data, a first alignment of a first display area associated with the first touch sensor relative to a second display area associated with the second touch sensor.

13. The system of claim 12, wherein the first coordinate is positioned within a first threshold distance of a first border of the first touch sensor and the second coordinate is positioned within a second threshold distance of a second border of the second touch sensor, the system further comprising computer-executable instructions to:

determine, based on the first coordinate and the second coordinate, a first position of the first border relative to a second position of the second border.

14. The system of claim 12, further comprising computer-executable instructions to:

determine, based on the first touch data received from the first computing device, input to the first touch sensor between the first time and the second time; and in response to the lack of input to the second touch sensor for the threshold length of time, cause the first computing device to present a first portion of content and the second computing device to present a second portion of the content, wherein the second portion of the content is positioned relative to the first portion of the content based on the first alignment.

15. The system of claim 12, further comprising computer-executable instructions to:

use the first computing device to determine input to the first touch sensor between the first time and the second time, wherein the second computing device determines the lack of input to the second touch sensor for the threshold length of time subsequent to the second time;

receive, from the second computing device, third touch data indicating the lack of input to the second touch sensor for the threshold length of time; and in response to the third touch data, cause the first computing device to present a first portion of content and the second computing device to present a second portion of the content, wherein the second portion of the content is positioned relative to the first portion of the content based on the first alignment.

16. The system of claim 12, further comprising computer-executable instructions to:

receive, at a third time subsequent to the second time, from a third computing device having a third touch sensor, third touch data indicating input to a third coordinate of the third touch sensor; and determine, based on the second touch data and the third touch data, a second alignment of the second display area relative to of a third display area associated with the third touch sensor.

17. The system of claim 16, further comprising computer-executable instructions to:

receive, at a fourth time subsequent to the third time, from the second computing device, fourth touch data indicating input to a fourth coordinate of the second touch sensor;

receive, at a fifth time subsequent to the fourth time, from the third computing device, fifth touch data indicating input to a fifth coordinate of the third touch sensor; and determine a third alignment of the third display area relative to the second display area based on the fourth touch data and the fifth touch data, wherein the third alignment is different from the second alignment.

18. The system of claim 16, further comprising computer-executable instructions to:

determine that the first time is within a threshold length of time of the second time; and determine that the second time is within the threshold length of time of the third time;

wherein the first alignment and the second alignment are determined in response to the first time being within the threshold length of time of the second time and the second time being within the threshold length of time of the third time.

19. The system of claim 12, wherein the second touch data further indicates input to a third coordinate of the second touch sensor, the system further comprising computer-executable instructions to:

receive, at a third time subsequent to the second time, from the first computing device, third touch data indicating input to a fourth coordinate of the first touch sensor, wherein the first alignment is further determined based on the third touch data; and in response to the third touch data, cause the first computing device to present a first portion of content and the second computing device to present a second portion of the content, wherein the second portion of the content is positioned relative to the first portion of the content based on the first alignment.

20. The system of claim 12, wherein the first coordinate is positioned within a first threshold distance of a first border of the first touch sensor, and the second coordinate is positioned within a second threshold distance of a second border of the second touch sensor, the system further comprising computer-executable instructions to:

receive, at a third time prior to the first time, from the first computing device, third touch data indicating input to a third coordinate of the first touch sensor;

determine a line based on the third coordinate and the first coordinate;

determine a location of the first coordinate relative to the second coordinate based on the line; and determine, based on the location, a first position of the first border relative to a second position of the second border.

* * * * *